(12) United States Patent
Norollahisomarin

(10) Patent No.: US 11,632,022 B1
(45) Date of Patent: Apr. 18, 2023

(54) BRUSHED DIRECT-CURRENT SLIP RING MOTOR

(71) Applicant: RH Motor Industry, LLC, Ft. Lauderdale, FL (US)

(72) Inventor: Reza Norollahisomarin, Ft. Lauderdale, FL (US)

(73) Assignee: RH Motor Industry, LLC, Ft. Lauderdale, FL (US)

( * ) Notice: Subject to any disclaimer, the term of this patent is extended or adjusted under 35 U.S.C. 154(b) by 0 days.

(21) Appl. No.: 18/060,001

(22) Filed: Nov. 30, 2022

(51) Int. Cl.
*H02K 13/00* (2006.01)
*H02K 7/00* (2006.01)
*H02K 13/10* (2006.01)

(52) U.S. Cl.
CPC ........... *H02K 13/003* (2013.01); *H02K 7/003* (2013.01); *H02K 13/006* (2013.01); *H02K 13/10* (2013.01)

(58) Field of Classification Search
CPC .... H02K 13/003; H02K 7/003; H02K 13/006; H02K 13/10
USPC ........................................................ 310/128
See application file for complete search history.

(56) References Cited

U.S. PATENT DOCUMENTS

| | | | |
|---|---|---|---|
| 6,812,612 B2 | 11/2004 | Schunk et al. | |
| 6,894,418 B2 | 7/2005 | Jones et al. | |
| 6,992,419 B2 | 1/2006 | Kim et al. | |
| 7,687,945 B2 | 3/2010 | Matin et al. | |
| 7,737,585 B2 | 6/2010 | Bähr et al. | |
| 8,264,114 B2 | 9/2012 | Taniguchi et al. | |
| 8,847,522 B2 | 9/2014 | Nashiki et al. | |
| 9,287,755 B2 | 3/2016 | Woolmer et al. | |
| 9,470,238 B2 | 10/2016 | Vande Sande et al. | |
| 9,472,997 B2 | 10/2016 | Figgins et al. | |
| 9,712,011 B2 | 7/2017 | Pyrhönen et al. | |
| 10,284,053 B2 | 5/2019 | Saiki et al. | |
| 10,566,866 B2 | 2/2020 | Woolmer | |
| 11,245,309 B2 | 2/2022 | Marvin | |
| 2007/0252447 A1 | 11/2007 | Ionel et al. | |
| 2013/0147291 A1 | 6/2013 | Woolmer et al. | |
| 2013/0187492 A1 | 7/2013 | Woolmer | |
| 2014/0322963 A1 | 10/2014 | Barker et al. | |

*Primary Examiner* — Terrance L Kenerly
(74) *Attorney, Agent, or Firm* — Bekiares Eliezer LLP

(57) ABSTRACT

The present disclosure provides a brushed direct-current slip ring motor comprising: a commutator-armature system secured to a stationary shaft of a motor base, the commutator-armature system comprising: commutator segments connected via wires, teeth in a circular orientation forming slots, and commutator leads connected to the commutator segments and secured to the wires; a top slip ring above the commutator segments; a bottom slip ring below the commutator segments, a rotor configured to axially rotate responsive to an electromagnetic field produced from the commutator-armature system comprising: a plurality of magnets configured to axially rotate with the rotational shaft; a first brush system in contact with one or more of the commutator segments, the first brush system being configured to axially rotate with the rotor; and a second brush system in contact with one or more of the commutator segments, the second brush system being configured to axially rotate with the rotor.

20 Claims, 28 Drawing Sheets

BRUSHED DIRECT-CURRENT SLIP RING MOTOR

FIELD OF DISCLOSURE

The present disclosure generally relates to brushed direct-current motors and motors having slip rings.

BACKGROUND

A brushed direct-current ("DC") motor and is a type of electric motor. Brushed DC motors are typically set up such that a pair of stationary permanent magnets or electromagnets surround an armature, typically embodied as sets of wire coils configured to rotate within the confine of the magnets. Each set of wires are connected to two opposing commutator rings oriented outside of the permanent magnet. A pair of brushes connected to a DC power source channel the DC current any pair of opposing commutator rings in contact with the brushes. As direct current flows from the commutator rings through a set of coils, an electromagnetic force is thereby induced in accordance with the Lorentz law creating a torque on the coils due to the magnetic polarities of the magnets. The torque exerted on the set of coils causes the coils and the armature to rotate. As the armature rotates, the commutator transfers the direct current to an adjacent set of coils thereby maintaining a relatively consistent torque and rotation of the armature, creating continuous rotation as long as the current is flowing.

In some brushed DC motors. to evenly separate the sets of wires, a circular setup of teeth forming slots therebetween each tooth may be used to guide and orient each set of wires.

While the functionality of brushed DC motors are valid, the operative capacity and utilization of magnetic and electromagnetic fields fall short on the portions of the motor ultimately rotated. While the rotation of the armature and commutator is well known, rotation of other portions of the motor that may produce more efficient and improved power output have not been considered.

A brushed DC motor that, when compared with conventional brushed DC motors, produces increased power output more efficiently while utilizing similar electromagnetic principles is needed.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

In some embodiments, the present disclosure may provide a brushed DC induction motor comprising: a motor base comprising: a base plate, and a stationary shaft extending orthogonally from a central portion of the base plate, the stationary shaft comprising a stationary shaft cavity; a commutator-armature system secured to at least a portion of the stationary shaft, the commutator-armature system comprising: a plurality of commutator segments arranged in a circular orientation, each of a first set of the plurality of commutator segments being connected to an opposing commutator segment of a second set of the plurality of commutator segments via a portion of a plurality of wires, an insulating portion spanning an inner perimeter of the plurality of commutator segments, a plurality of teeth disposed above the plurality of commutator segments and arranged in a circular orientation forming a plurality of slots, the plurality of slots being configured to separate each of the portions of the plurality of wires, and a plurality of commutator leads, each of the plurality of commutator leads connected to one of the plurality of commutator segments on a first end and secured to one end of the portion of the plurality of wires on a second end; a top slip ring disposed above the plurality of commutator segments, the top slip ring being configured to receive channel electricity from a first direct current wire secured to the top slip ring; a bottom slip ring disposed below the plurality of commutator segments, the bottom slip ring being configured to receive channel electricity to a second direct current wire secured to the bottom slip ring, a rotor configured to axially rotate responsive to an electromagnetic field produced from the commutator-armature system, the rotor comprising: a rotational shaft, at least a portion of the rotational shaft affixed within the stationary shaft cavity, a rotor housing secured to a top portion of the rotational shaft and configured to house at least a portion of the commutator armature system, a plurality of magnets evenly distributed around an inner wall of the rotor housing on the same plane as the plurality of teeth and configured to axially rotate with the rotational shaft; a first brush system secured to an inner wall of the rotor housing and in contact with one or more of the plurality of commutator segments, the first brush system being configured to axially rotate with the rotor, a second brush system secured to an opposing side of the inner wall of the rotor housing as the first brush housing and in contact with one or more of the plurality of commutator segments, the second brush system being configured to axially rotate with the rotor.

In further embodiments, the present disclosure may provide a brushed DC induction motor comprising: a motor base comprising: a base plate, and a stationary shaft extending orthogonally from a central portion of the base plate, the stationary shaft comprising a stationary shaft cavity; a commutator-armature system secured to at least a portion of the stationary shaft, the commutator-armature system comprising: a first set of a plurality of commutator segments, each of the first set of the plurality of commutator segments being connected to an opposing commutator segment of a second set of the plurality of commutator segments via a portion of a plurality of wires, an insulating portion spanning an inner perimeter of the plurality of commutator segments, a plurality of teeth disposed above the plurality of commutator segments and arranged to form a plurality of slots therebetween, the plurality of slots being configured to group each of the portions of the plurality of wires, and a plurality of commutator leads, each of the plurality of commutator leads comprising: a commutator lead bottom portion connected to one of the plurality of arcuate segments, a commutator lead middle portion extending through a portion of the insulating portion, and a commutator lead top portion secured to one end of the portion of the plurality of wires; a top slip ring disposed above the plurality of commutator segments and below the plurality of teeth; a bottom slip ring disposed below the plurality of commutator segments, a first direct current wire secured to the top slip ring; a second direct current wire secured to the bottom slip ring; a rotor configured to axially rotate responsive to an electromagnetic field being produced from the commutator-armature system, the rotor comprising: a rotational shaft, at least a portion of the rotational shaft affixed within the stationary shaft cavity, a rotor housing comprising: a rotor housing top portion secured to a top portion of the rotational shaft, and a rotor housing outer ring secured to the rotor housing top portion, a plurality of rotor bearings disposed between the rotational shaft and an inner wall of the stationary shaft cavity; a plurality of magnets evenly distributed around an inner wall of the rotor housing on the same plane as the plurality of teeth and configured to axially rotate with the rotational shaft; a first brush system configured to axially rotate with the rotor, the first brush system comprising: a first brush housing secured to inner wall of the rotor housing below the plurality of magnets, the first brush housing comprising: a first aperture, and a first back wall, a first brush housed in the first brush housing in which a portion of the first brush protrudes from the first aperture, the first brush being configured to contact the top slip ring, and a first tension means oriented between the first back wall and the first brush, the first tension means being configured to maintain contact between the first brush and the top slip ring; and a second brush system configured to axially rotate with the rotor, the second brush system comprising: a second brush housing secured to inner wall of the rotor housing opposite the first brush housing, the first brush housing comprising: a second aperture, and a second back wall, a second brush housed in the second brush housing in which a portion of the second brush protrudes from the second aperture, the second brush being configured to contact the bottom slip ring, and a second tension means oriented between the back wall and the second brush, the second tension means being configured to maintain contact between the second brush and the bottom slip ring.

In further embodiments, the present disclosure may provide a brushed DC induction motor comprising: a commutator-armature system secured to at least a portion of a stationary shaft of a motor base, the commutator-armature system comprising: a first set of a plurality of commutator segments, each of the first set of the plurality of commutator segments being connected to an opposing commutator segment of a second set of the plurality of commutator segments via a portion of a plurality of wires, an insulating portion spanning an inner perimeter of the plurality of commutator segments, a plurality of teeth disposed above the plurality of commutator segments and arranged in a circular orientation forming a plurality of slots, the plurality of slots being configured to separate each of the portions of the plurality of wires, and a plurality of commutator leads, each of the plurality of commutator leads connected to one of the plurality of commutator segments on a first end and secured to one end of the portion of the plurality of wires on a second end; a top slip ring secured to the stationary shaft and disposed above the plurality of commutator segments, the top slip ring being configured to channel electricity from a first direct current wire secured to the top slip ring; a bottom slip ring secured to the stationary shaft and disposed below the plurality of commutator segments, the bottom slip ring being configured to channel electricity to a second direct current wire secured to the bottom slip ring, a rotor configured to axially rotate responsive to an electromagnetic field produced from the commutator-armature system, the rotor comprising: a rotational shaft affixed within a cavity of the stationary shaft, a rotor housing secured to a top portion of the rotational shaft and configured to house at least a portion of the commutator armature system, a plurality of magnets evenly distributed around an inner wall of the rotor housing on the same plane as the plurality of teeth and configured to axially rotate with the rotational shaft; a first brush system secured to an inner wall of the rotor housing and in contact with one or more of the plurality of commutator segments, the first brush system being configured to axially rotate with the rotor; and a second brush system secured to an opposing side of the inner wall of the rotor housing as the first brush housing and in contact with one or more of the plurality of commutator segments, the second brush system being configured to axially rotate with the rotor.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
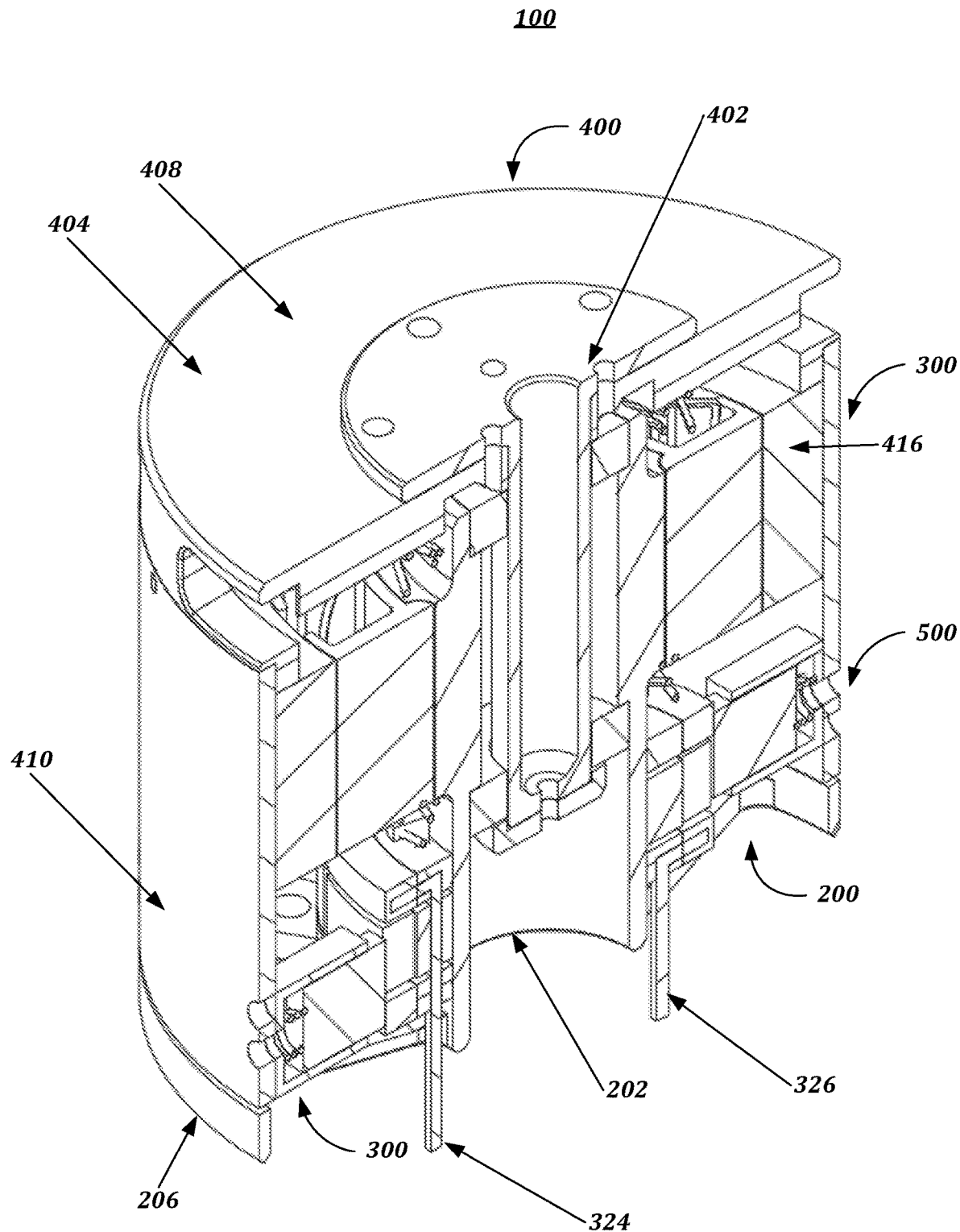
FIG. 1 illustrates a cross-sectional view of a brushed direct-current motor 100.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of brushless direct-current (BLDC) motors, embodiments of the present disclosure are not limited to use only in this context.

I. Apparatus Overview

This overview is provided to introduce a selection of concepts in a simplified form that are further described below. This overview is not intended to identify key features or essential features of the claimed subject matter. Nor is this overview intended to be used to limit the claimed subject matter's scope.

A brushed DC motor with a base, brushes, an armature-commutator setup, and rotor (motor 100 and/or apparatus 100) may be provided. The motor may produce mechanical and/or rotational energy when supplied with direct current electricity.

The motor may have a motor base used to secure stationary components of the motor to the base and one another. The motor base may include a stationary shaft protruding from a base plate of the motor.

Further, the motor may have a commutator-armature system secured, at least in part, to the motor base. The commutator-armature system is used to generate a magnetic field via an electrical current being channeled through a first commutator segment, into a commutator lead, then into a grouping of wires connected to the lead on one end, guided away from the lead and first commutator segment, wrapped partially around the stationary shaft, and secured on another end to another lead connected to another commutator segment oriented opposite the first commutator segment. The grouping of wires may be secured and/or guided through a slot of a stator made between two teeth disposed above the leads on each side. The setup of commutator segments, wire grouping, and stator slots and teeth may be numerous and disposed uniformly around the stationary shaft. The wires and stator make up the armature portion of the commutator-armature system. Unlike traditional brushed DC motors, the current embodiment is configured to have the motor base and commutator-armature system (including the stator) remain stationary while in use (i.e., electrical current is flowing through the motor).

The commutator may be made from the commutator segments oriented in a circular orientation. Above and below the commutator may be slip rings. One slip ring is used to channel direct current electricity from a direct current wire, into the slip ring, through a brush in contact with the slip ring, and into the commutator segment currently in contact with the brush. The other slip ring is used to channel direct current from another commutator segment into another brush currently in contact with the other commutator segment, into the other slip ring, and out of the motor via another direct current wire.

The brushes may be secured to a housing of a rotor. The rotor may have a rotational shaft housed within the stationary shaft. The rotational shaft may secure to the rotor housing. Secured to and disposed within the rotor housing are magnets oriented around the groups of wires. When the magnetic field is generated by the armature, the magnets are pushed away from the armature (i.e., a turning effect) thereby causing the magnets, rotor, and brushes to rotate.

As the rotor and components thereof rotate, each brush channeling the current transfers the current to the next commutator segment and thereby the next armature portion, making the rotor rotate in a constant direction, via the current translating the magnetic field into the next commutator segment and armature portion, thereby causing the rotor to continue to rotate in the same direction at a constant speed. The motor being configured to rotate the rotor, magnets, and brushes creates a diameter of rotation greater that traditional brushed DC motors and/or induction motors thereby producing greater torque when compared to he aforementioned motors.

Embodiments of the present disclosure may comprise methods, systems, and components comprising, but not limited to, at least one of the following:

A. A Motor Base 200;
B. A Commutator-Armature System 300;
C. A Rotor 400;
D. A First Brush System 500;
E. A Second Brush System 600; and Details with regards to each component is provided below. Although components are disclosed with specific functionality, it should be understood that functionality may be shared between components, with some functions split between components, while other functions duplicated by the components. Furthermore, the name of the component should not be construed as limiting upon the functionality of the component. Moreover, each stage disclosed within each component can be considered independently without the context of the other stages within the same component or different components. Each stage may contain language defined in other portions of this specifications. Each stage disclosed for one component may be mixed with the operational stages of another component. In the present disclosure, each stage can be claimed on its own and/or interchangeably with other stages of other components.

The following depicts an example of a method of a plurality of methods that may be performed by at least one of the aforementioned components. Various hardware components may be used at the various stages of operations disclosed with reference to each component. For example, although methods may be described to be performed by a single apparatus, it should be understood that, in some embodiments, different operations may be performed by different apparatuses in operating in conjunction with each other. For example, the apparatus 100 and/or components thereof may be employed in the performance of some or all of the stages disclosed with regard to the methods. Similarly, one apparatus may be employed in the performance of some or all of the stages of the methods. As such, the apparatus may comprise at least one of the architectural components disclosed herein.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

Consistent with embodiments of the present disclosure, a method may be performed by at least one of the aforementioned components. The method may be embodied as, for example, but not limited to, computer instructions, which when executed, perform the method. The method may comprise the following stages:

molding (and/or casting) a planar portion 206,
securing a stationary shaft 202 to a portion of planar portion 206,
orienting a plurality of commutator segments 302 around a stationary shaft 202:
securing a commutator insulating portion 306 to an inner perimeter of the plurality of commutator segments 302,
orienting a top slip ring 320 above the plurality of commutator segments 302,
orienting a bottom slip ring 322 below the plurality of commutator segments 302,
for each of a plurality of commutator leads 312, securing a commutator lead bottom portion 314 to each of the plurality of commutator segments 302;
for each of the plurality of commutator leads 312, securing a commutator lead middle portion through the commutator insulating portion 306 such that a commutator lead top portion 318 protrudes above the top slip ring 320;
orienting a plurality of commutator teeth 308 around the stationary shaft 202:
for each of a first set of the plurality of commutator segments 302, connecting to an opposing commutator segment of a second set of the plurality of commutator segments 302 via the portion of the plurality of wires 304, the connecting comprising:
rotatably mounting a rotational shaft 402 within a stationary shaft cavity 204,
securing a rotor housing top portion 408, of a rotor housing 404, to the rotational shaft 402;

securing a rotor housing outer ring 410 to the rotor housing top portion 408; and orienting a plurality of rotor bearings 414 between the rotational shaft 402 and an inner wall of the stationary shaft cavity 204 of a commutator-armature system 300.

securing a first brush housing 502 to a rotor housing outer ring 410, securing a first brush tension means 510 to a first back wall 506 of the first brush housing 502, housing a first brush 508 in the first brush housing 502, securing a second brush housing 602 to the rotor housing outer ring 410, securing a second brush tension means 610 to a second back wall 606 of the second brush housing 602, housing a second brush 608 in the second brush housing 602, channeling a direct current into the brushed direct current motor, Thereby forming electromagnetic field in a portion of the plurality of wires 304 connected to a first commutator segment of the plurality of commutator segments 302 in contact with the first brush 508 and a second commutator segment of the plurality of commutator segments 302 in contact with the second brush 608;

resultant from the electromagnetic field being turned, exerting a torque on the brush system and the rotor, the brush system and the rotor axially rotating around the commutator armature system and the motor base.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

II. System Configuration

One possible embodiment of a component of the system may be provided by the RH Motor Industry suite of products and services.

It is noted that the phrase "any other suitable shape" may be embodied as one or more (or any combination of) of the following:
 a. circular,
 b. cylindrical,
 c. pyramidal,
 d. square,
 e. conical,
 f. rectangular,
 g. polygonal,
 h. toroidal (with any suitable cross-section),
 i. trapezoidal,
 j. triangular,
 k. spherical,
 l. rhomboidal,
 m. organic,
 n. pentagonal, and
 o. prism shaped.

It is further noted that the term "fluid" may be used interchangeably with the term "liquid".

Accordingly, embodiments of the present disclosure provide an apparatus 100 comprised of a distributed set of components, including, but not limited to:

A. Motor Base 200

At least FIGS. 1-5, 15, and 22 illustrate the motor base 200 consistent with an embodiment of the disclosure. The motor base 200 may be used as a stationary element of the apparatus 100. The motor base 200 may be molded, formed, and/or constructed as one (continuous) single piece.

At least a portion of the motor base 200 may be secured to other portions of the motor base 200 and/or other portions (and/or components) of the apparatus 100 via nuts, bolts, screws, welding, adhesive, friction fit, and/or any other suitable securing means.

In some embodiments, the motor base 200 may have a substantially planar portion 206, illustrated at least in FIGS. 1-6. In some embodiments, at least a part of the planar portion 206 may be, ring-shaped, and/or toroidal in shape (with or without a square and/or rectangular cross-section) with or without gaps and/or apertures.

Figure 2:
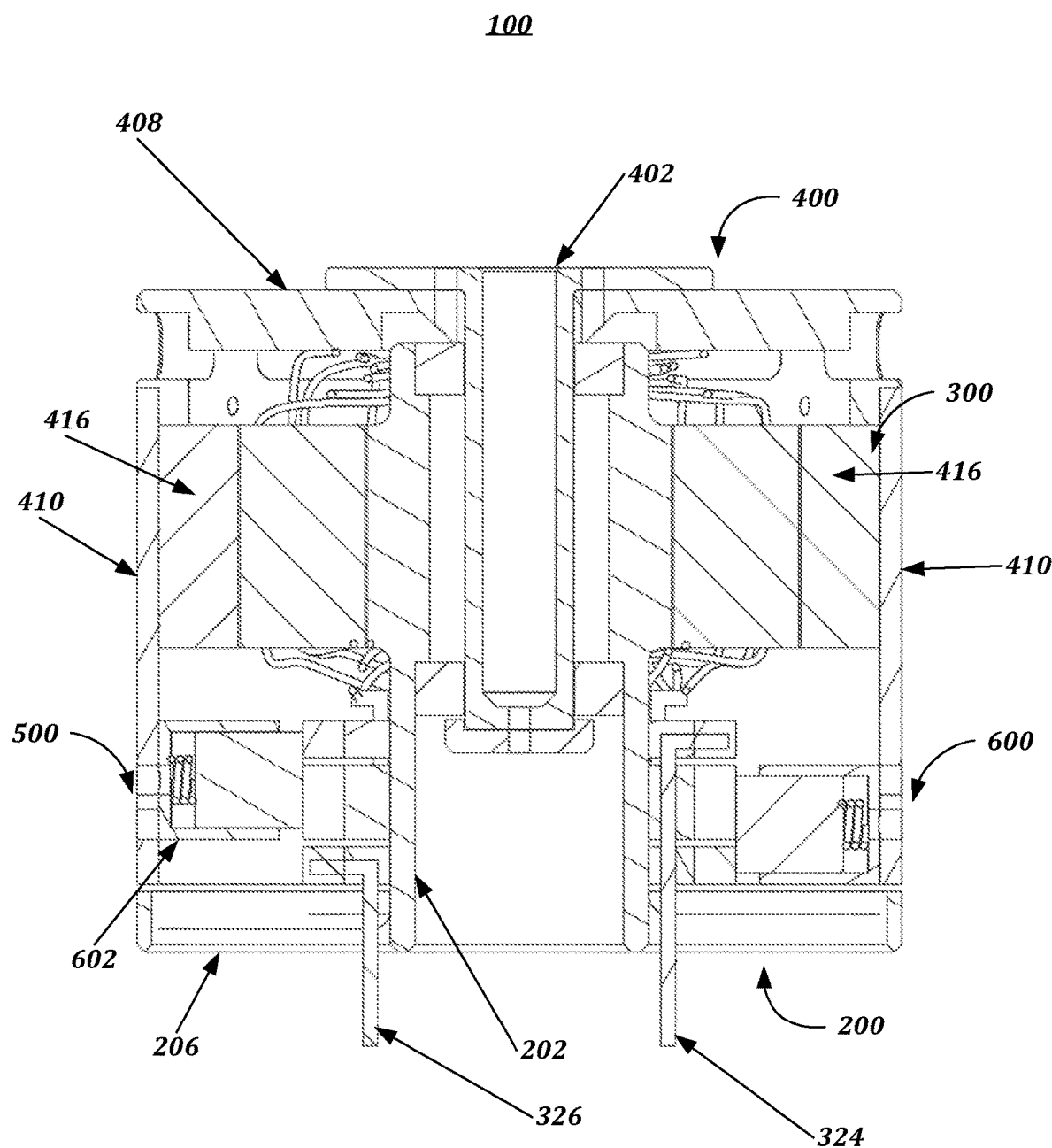
FIG. 2 illustrates a side view of the motor 100.
Figure 5:
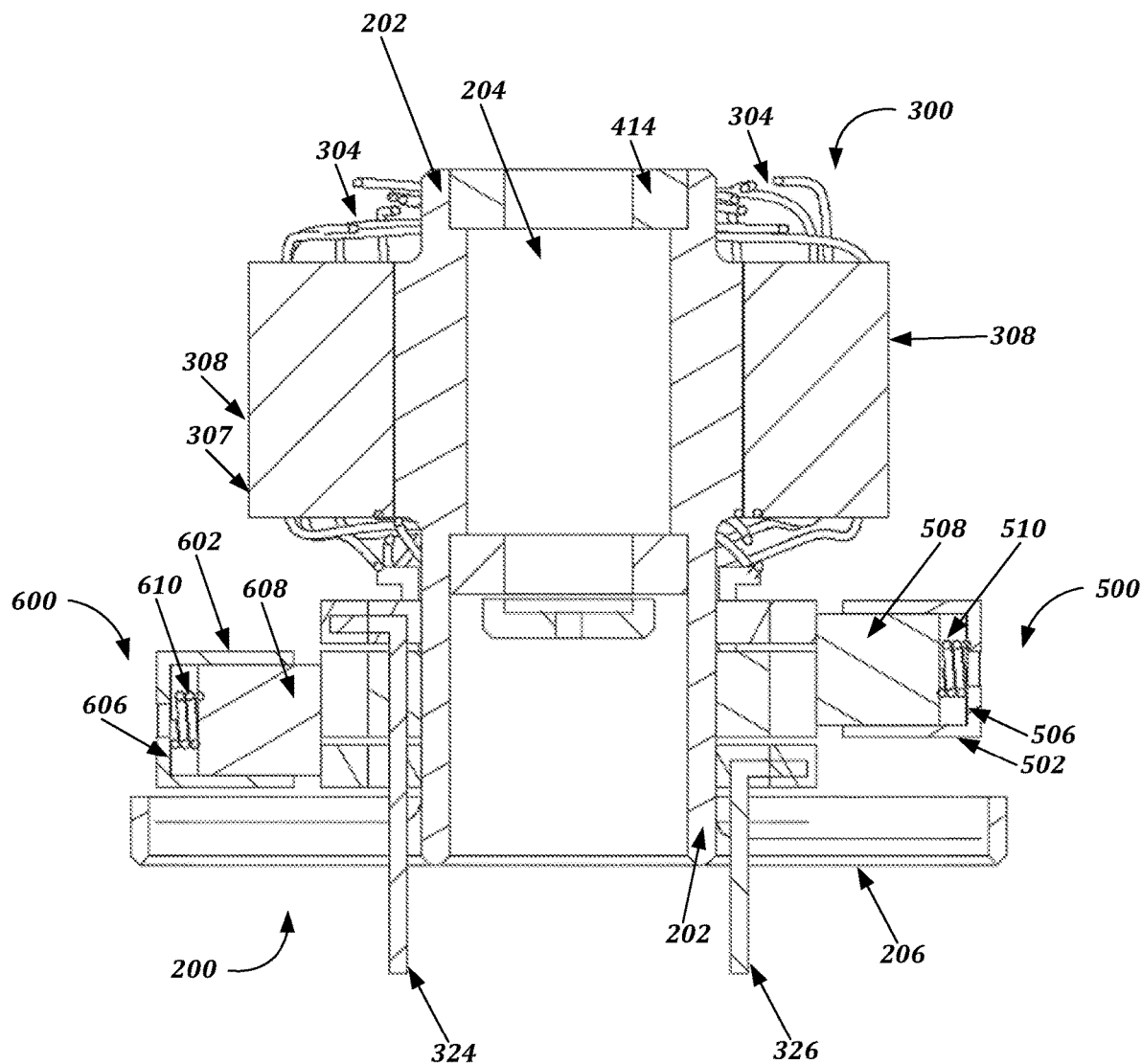
FIG. 5 illustrates a cross-sectional side view of a portion of the motor 100.

In some embodiments, the motor base 200 may comprise a stationary shaft 202, illustrated at least in FIGS. 1-2 and 5. The stationary shaft 202 may be used to retain, house, and/or engage elements of the motor base 200 and/or other portions of the apparatus 100. The stationary shaft 202 may be molded, formed, and/or constructed together as a single piece with the planar portion 206. In some embodiments, the stationary shaft 202 may be protrude orthogonally from the planar portion 206. In further embodiments, the stationary shaft 202 may be protrude from a middle portion of the planar portion 206. In further embodiments, the stationary shaft 202 may comprise a stationary shaft cavity 204, illustrated at least in FIGS. 5-6. In some embodiments, the stationary shaft cavity 204 may be substantially cylindrical in shape.

B. Commutator-Armature System 300

At least FIGS. 1-16 illustrates the commutator-armature system 300 consistent with an embodiment of the disclosure. The commutator-armature system 300 may be used to allow and/or facilitate rotational motion of the rotor 400 resultant from magnetic flux and/or electromagnetic forces applied to at least a portion of the rotor 400. The commutator-armature system 300 may be used to create a uniform and/or consistent magnetic field while the apparatus is in use. In some embodiments, the commutator-armature system 300 may be operatively connected to at least a portion of the stationary shaft 202.

In further embodiments, the commutator-armature system 300 may comprise a plurality of commutator segments 302, illustrated at least in FIGS. 4, 6-7, 9, and 11-14. The plurality of commutator segments 302 may be secured to a portion of the stationary shaft 202. In some embodiments, the plurality of commutator segments 302 may be arranged in a circular orientation. In further embodiments, each of a first set of the plurality of commutator segments 302 may be arcuate in shape. In further embodiments, each of a first set of the plurality of commutator segments 302 may be connected to an opposing commutator segment of a second set of the plurality of commutator segments 302 via a portion of a plurality of wires 304, illustrated at least in FIGS. 4-8. The plurality of wires 304 may be used to conduct electricity and/or facilitate creation of an electromagnetic current responsive to an introduction of an electrical current transmitted through the plurality of windings 304. In some embodiments, the plurality of wires 304 may be embodied as coils and/or windings. In some embodiments, the plurality of wires 304 may be wound via wave winding and/or lap winding. The plurality of windings may be tightly wound at various densities and thicknesses (not shown) to minimize and/or reduce magnetic flux leakage.

In further embodiments, the commutator-armature system 300 may comprise a commutator insulating portion 306. The commutator insulating portion 306 may be used to insulate the plurality of commutator segments 302 from a plurality of commutator leads 312. In some embodiments, the commutator insulating portion 306 may span an inner perimeter of the plurality of commutator segments 302.

In further embodiments, the commutator-armature system 300 may comprise a stator 307 illustrated at least in FIGS. 4-8, and 21-22. The stator 307 may be made from, at least in part, a plurality of permeable layers such as, but not limited to, layers of silicon steel (sometimes from a single sheet of silicon steel). The stator 307 may comprise a plurality of teeth 308 illustrated at least in FIGS. 4-8. In some embodiments, the plurality of teeth 308 may comprise, and/or be made from, permeable metal (e.g., steel) and/or semi-permeable layers. The plurality of teeth 308 may be used as a conductor, semiconductor, and/or insulator of (direct) electrical current. In some embodiments, the plurality of teeth 308 may be I-Shaped, H-shaped, and/or T-shaped. In further embodiments, the plurality of teeth 308 may be removable and/or interchangeable from the commutator-armature system 300. The plurality of teeth 308 may be oriented above the plurality of commutator segments 302.

Figure 4:
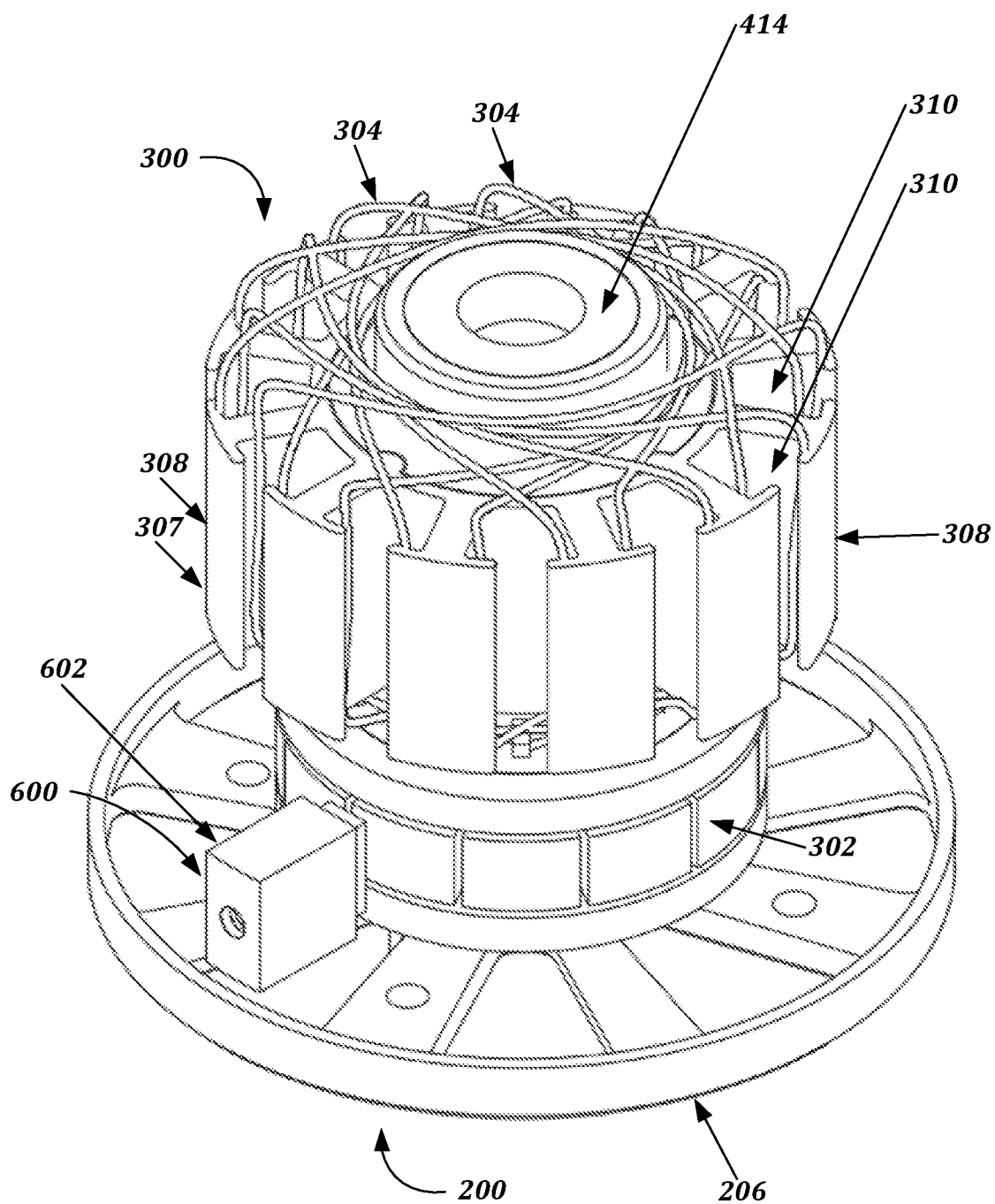
FIG. 4 illustrates a perspective view of a portion of the motor 100.
Figure 6:
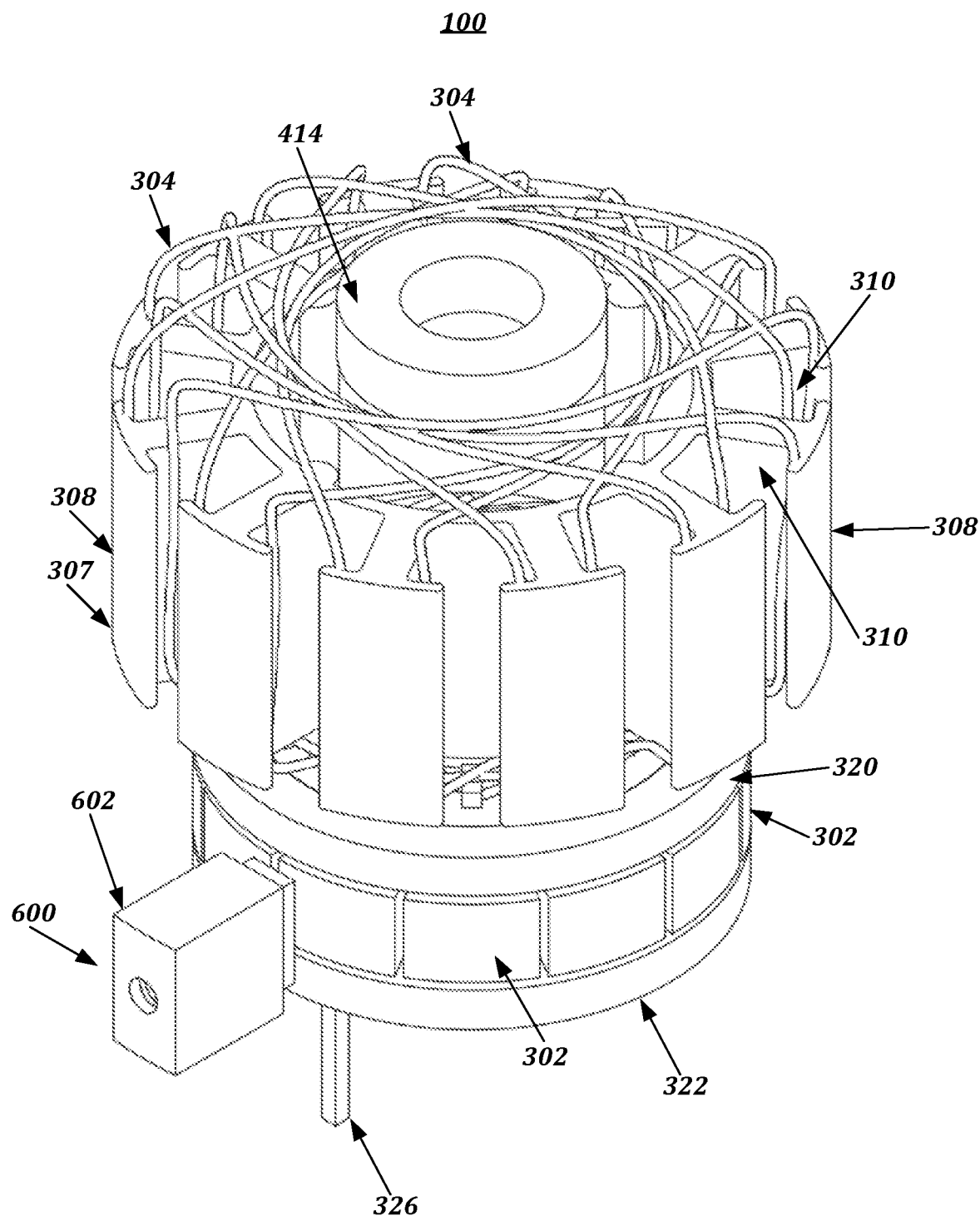
FIG. 6 illustrates another perspective view of a portion of the motor 100.
Figure 7:
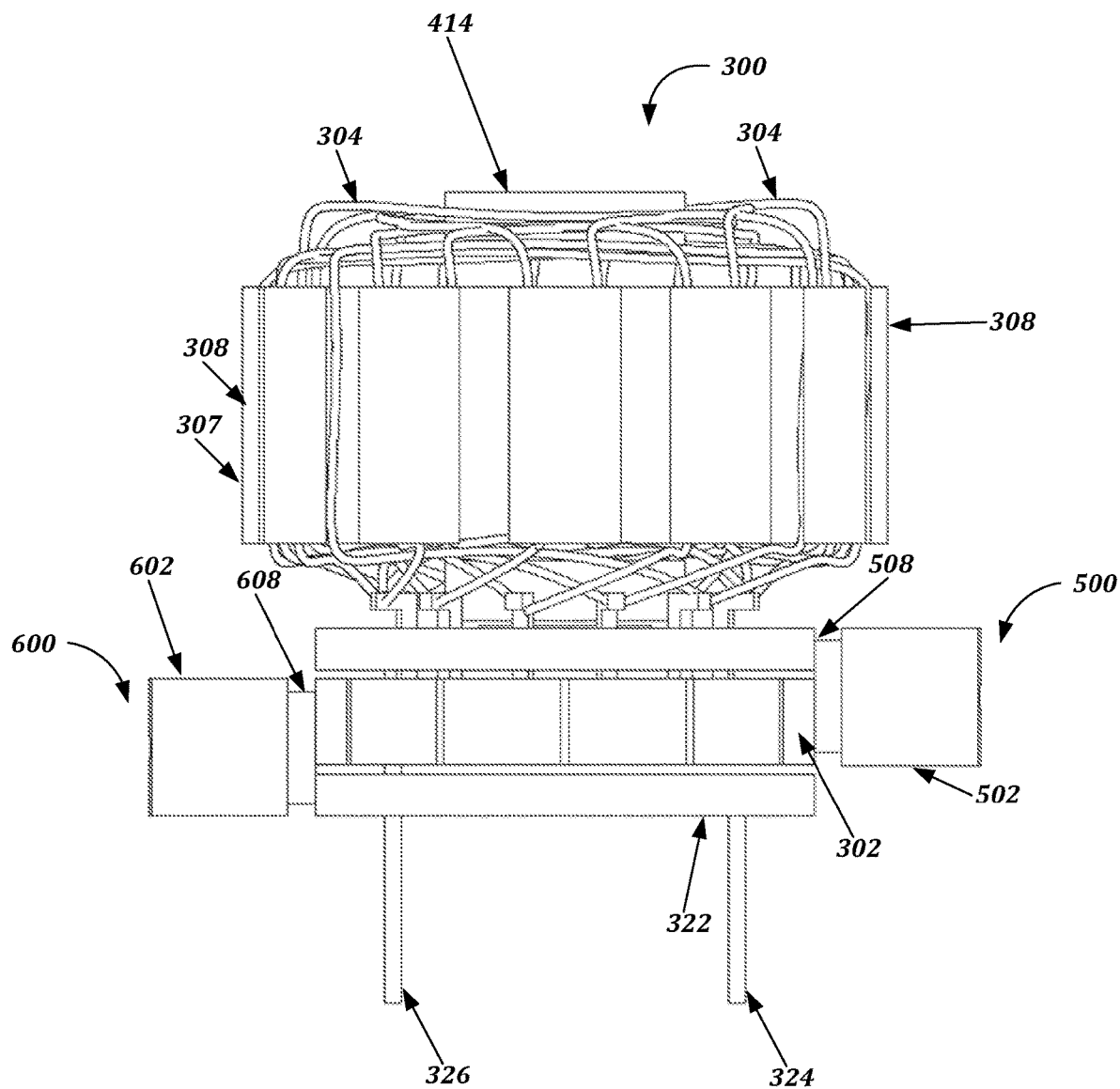
FIG. 7 illustrates a side view of a portion of the motor 100.
Figure 19:
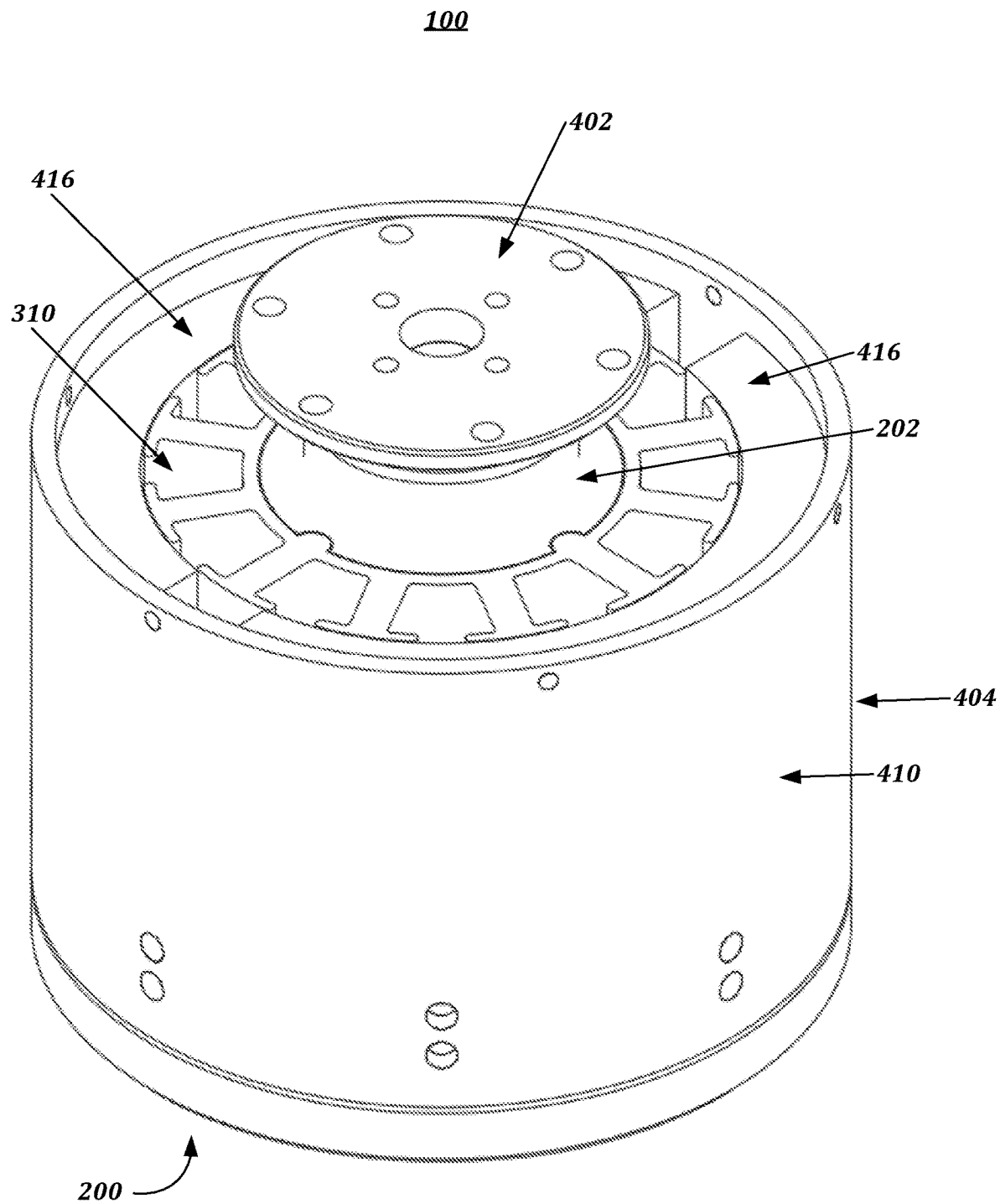
FIG. 19 illustrates another perspective view of a portion of the motor 100.

The plurality of teeth 308 may be further arranged in a circular orientation forming a plurality of slots 310 illustrated at least in FIGS. 4, 6, and 19. In some embodiments, the plurality of slots 310 may be configured to group each of the portions of the plurality of wires 304. In some embodiments, the plurality of slots 310 may be configured to guide each of the portions of the plurality of wires 304 around the rotational shaft.

Figure 17B:
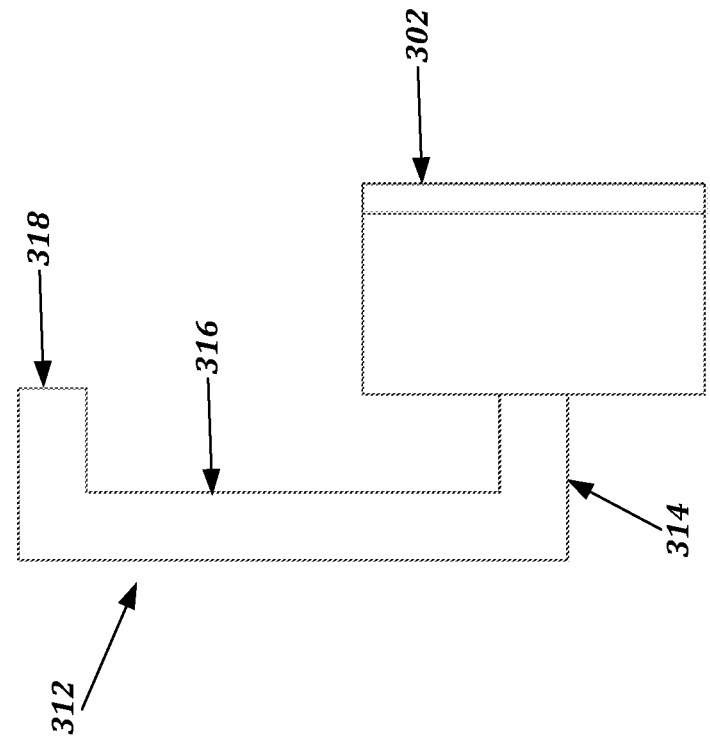
FIG. 17B illustrates a side view of a commutator lead 312 and a commutator segment 302.
Figure 17A:
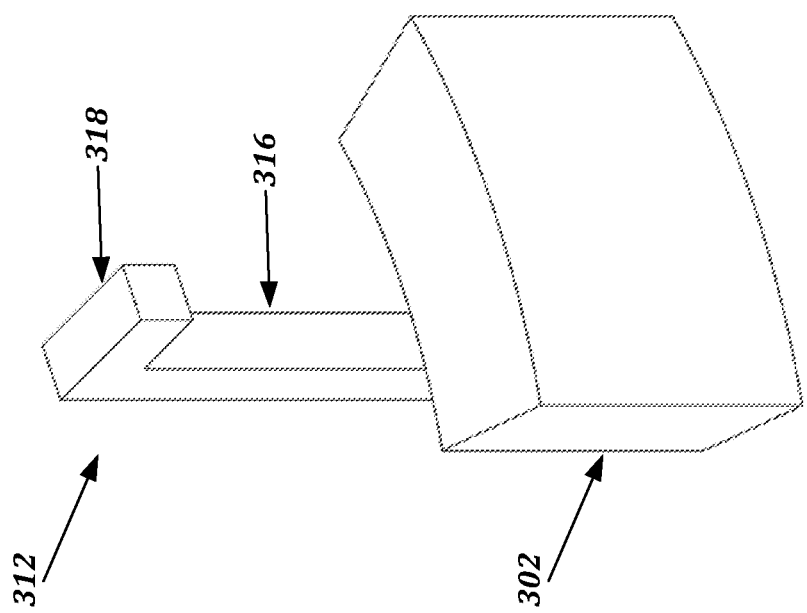
FIG. 17A illustrates a perspective view of a commutator lead 312 and a commutator segment 302.

In further embodiments, the commutator-armature system 300 may comprise the plurality of commutator leads 312, illustrated at least in FIGS. 17A-17B. The plurality of commutator leads 312 may be used to channel electricity and/or electrical power from each of the plurality of commutator segments 302 to their respective portion of the plurality of wires 304. The plurality of commutator leads 312 may be insulated from any other portion of the motor 100 not in contact with each commutator lead 312. In some embodiments, each of the plurality of commutator leads 312 may comprise a commutator lead bottom portion 314, illustrated at least in FIGS. 17A-17B. Each commutator lead bottom portion 314 may be connected to one of the plurality of commutator segments 302. In further embodiments, each of the plurality of commutator leads 312 may comprise a commutator lead middle portion 316, illustrated at least in FIGS. 17A-17B. The commutator lead middle portion 316 may extend through a portion of the commutator insulating portion 306. In some embodiments, each of the plurality of commutator leads 312 may comprise commutator lead top portion 318, illustrated at least in FIGS. 11-14 and 17A-17B. The commutator lead top portion 318 may be secured to one end of the portion of the plurality of wires 304.

In further embodiments, the commutator-armature system 300 may comprise a top slip ring 320, illustrated at least in FIGS. 6 and 8-14. The top slip ring 320 may be used to channel and/or introduce (direct current) electricity and/or electrical power from a first direct current wire 324 secured to the top slip ring 320 to the first brush system 500 and/or one of the plurality of commutator segments 302. In other embodiments, the top slip ring 320 may be used to receive (direct current) electricity and/or electrical current from the first brush system 500 and/or one of the plurality of commutator segments 302 to a first direct current wire 324. The top slip ring 320 may be insulated from the plurality of commutator segments. The first direct current wire 324 may be insulated from any other portion of the motor 100 not in contact with the first direct current wire 324. In further embodiments, the top slip ring 320 may be toroidal (with a rectangular cross section) in shape. In other embodiments, the top slip ring 320 may comprise a top slip ring insulating portion spanning an inner perimeter of the top slip ring 320. In further embodiments, the top slip ring 320 may be disposed and/or oriented above the plurality of commutator segments 302 and/or below the plurality of teeth 308. In some embodiments, the first direct current wire 324 may be used to introduce and/or direct a positive and/or negative direct current of electrical flow into the apparatus 100 and/or the top slip ring 320.

In further embodiments, the commutator-armature system 300 may comprise a bottom slip ring 322, illustrated at least in FIGS. 6 and 8-14. The bottom slip ring 322 may be used to channel and/or introduce (direct current) electricity and/or electrical power from a second direct current wire 326 secured to the bottom slip ring 322 to a second brush system 600 and/or one of the plurality of commutator segments 302. The second direct current wire 326 may be insulated from any other portion of the motor 100 not in contact with the second direct current wire 326. In other embodiments, the bottom slip ring 322 may be used to receive (direct current) electricity and/or electrical current from the second brush system 600 and/or one of the plurality of commutator segments 302 to a second direct current wire 326. The bottom slip ring 322 may be insulated from the plurality of commutator segments. In some embodiments, the bottom slip ring 322 may be disposed and/or oriented below the plurality of commutator segments 302 and/or above the planar portion 206. In further embodiments, the bottom slip ring 322 may be toroidal (with a rectangular cross section) in shape. In other embodiments, the bottom slip ring 322 may comprise a bottom slip ring insulating portion spanning an inner perimeter of the bottom slip ring 322. In some embodiments, the second direct current wire 326 may be used to introduce and/or direct a positive and/or negative direct current of electrical flow into the apparatus 100 and/or the bottom slip ring 322.

In further embodiments, the commutator-armature system 300 may be secured to the motor base 200 (and/or other parts of the apparatus 100) via nuts, bolts, screws, welding, adhesive, friction fit, and/or any other suitable securing means.

C. Rotor 400

At least FIGS. 1-3 and 18-19 illustrate the rotor 400 consistent with an embodiment of the disclosure. The rotor 400 may be used to, responsive to an electromagnetic force being produced from the commutator-armature system 300, axially rotate. At least a portion of the rotor 400 may be secured to other portions of the rotor 400 and/or other portions (and/or components) of the apparatus 100 via nuts, bolts, screws, welding, adhesive, friction fit, and/or any other suitable securing means.

In some embodiments, the rotor 400 may comprise a rotational shaft 402, illustrated at least in FIGS. 1-3 and 18-19. The rotational shaft 402 may be rotatably mounted, housed, and/or affixed within the stationary shaft cavity 204. In some embodiments, at least a portion of the rotation shaft 402 may be ring shaped, cylindrical, and/or any other suitable shape.

Figure 3:
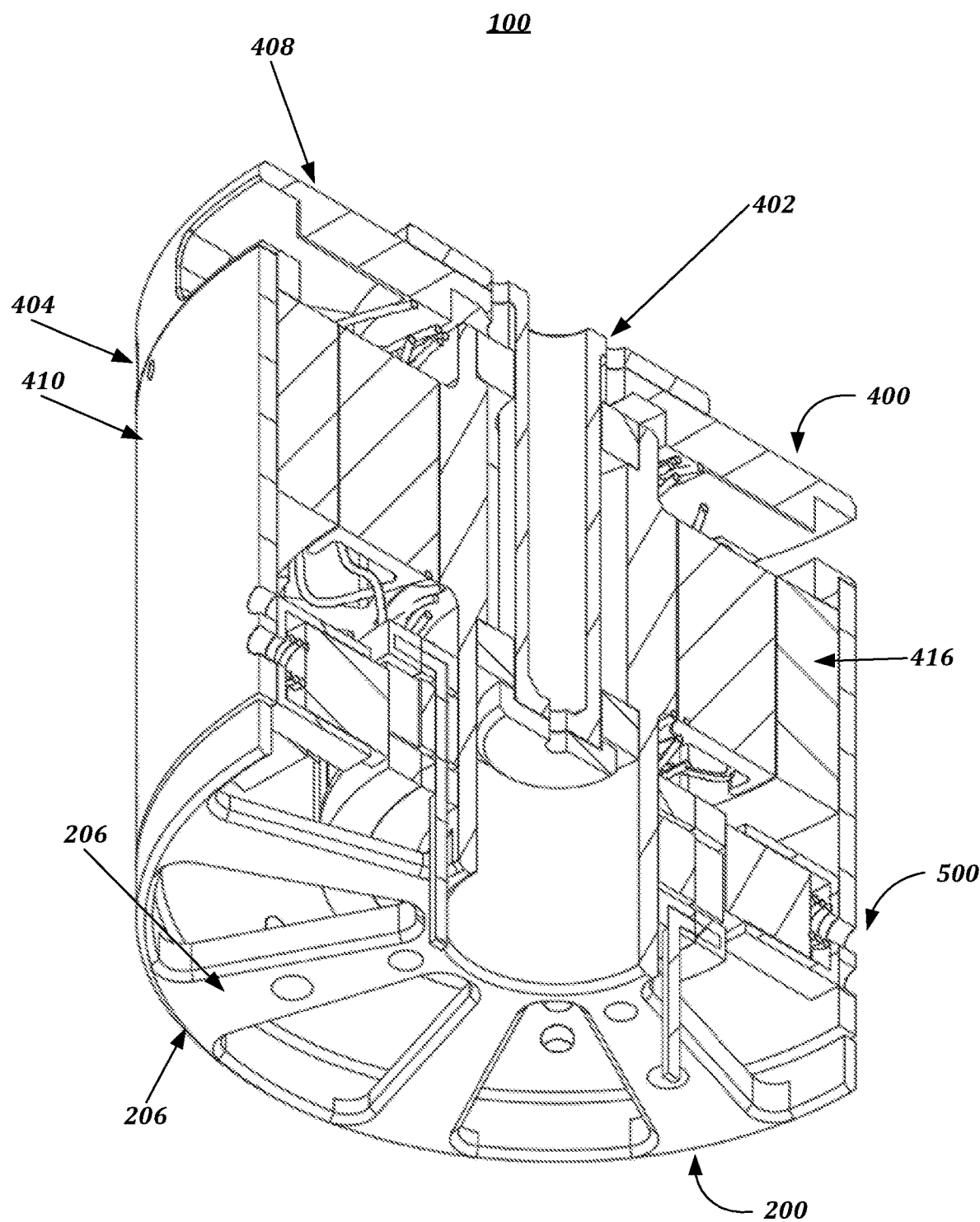
FIG. 3 illustrates a cross-sectional perspective view of the motor 100.
Figure 18:
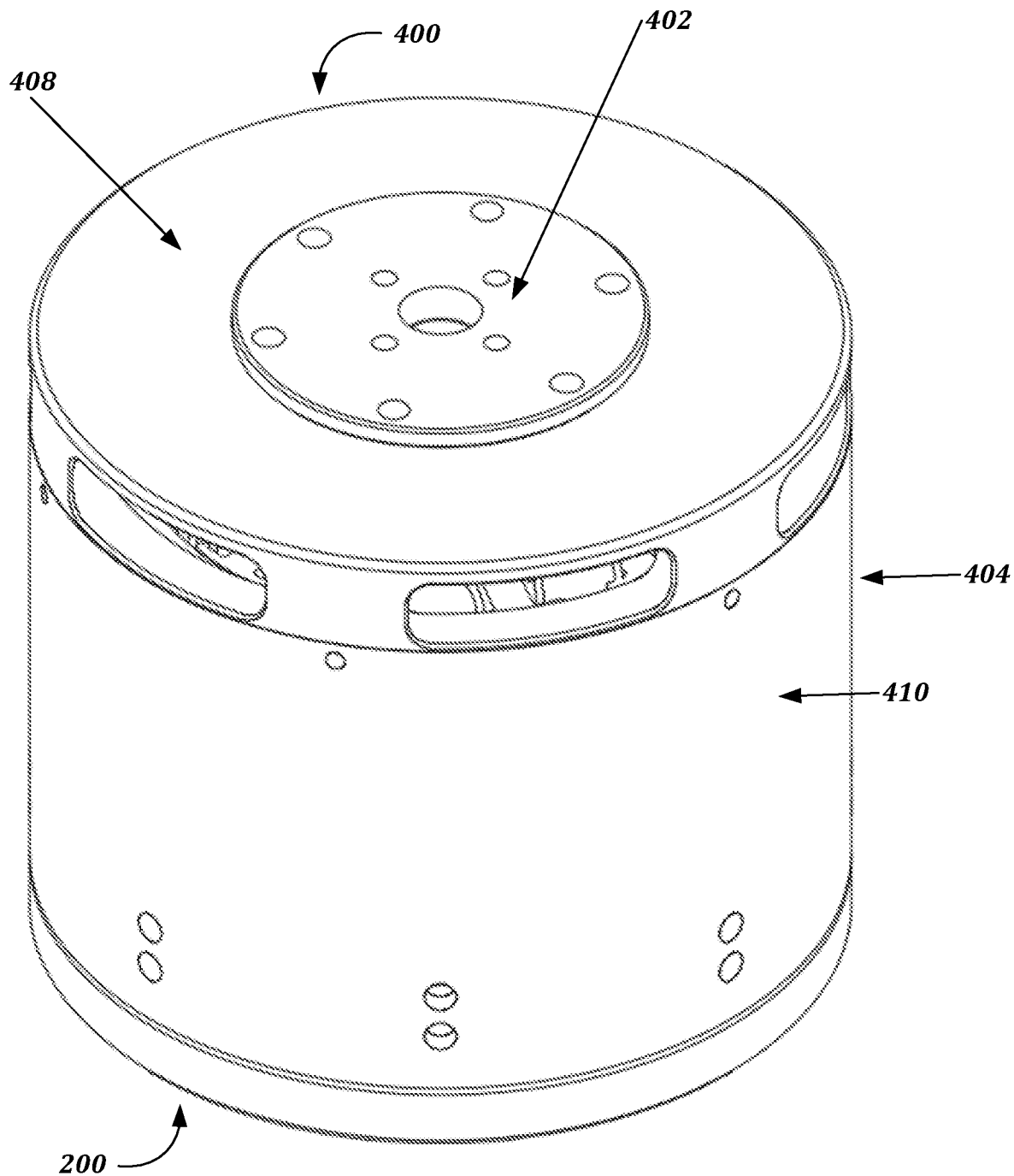
FIG. 18 illustrates another perspective view of the motor 100.

In further embodiments, the rotor 400 may comprise a rotor housing 404, illustrated at least in FIGS. 1, 3, and 18. The rotor housing 404 may be used to receive and/or house various parts of the apparatus 100. In some embodiments, the rotor housing 404 may comprise a rotor housing top portion 408, illustrated at least in FIGS. 1-3 and 18. The rotor housing top portion 408 may be secured to a top portion of the rotational shaft 402. In some embodiments, the rotor housing top portion 408 may be circular in shape, cylindrical shape, and or any other suitable shape. In further embodiments, the rotor housing 404 may comprise a rotor housing outer ring 410, illustrated at least in FIGS. 1-3 and 18-19. The rotor housing outer ring 410 may secured to the rotor housing top portion 408.

Figure 15:
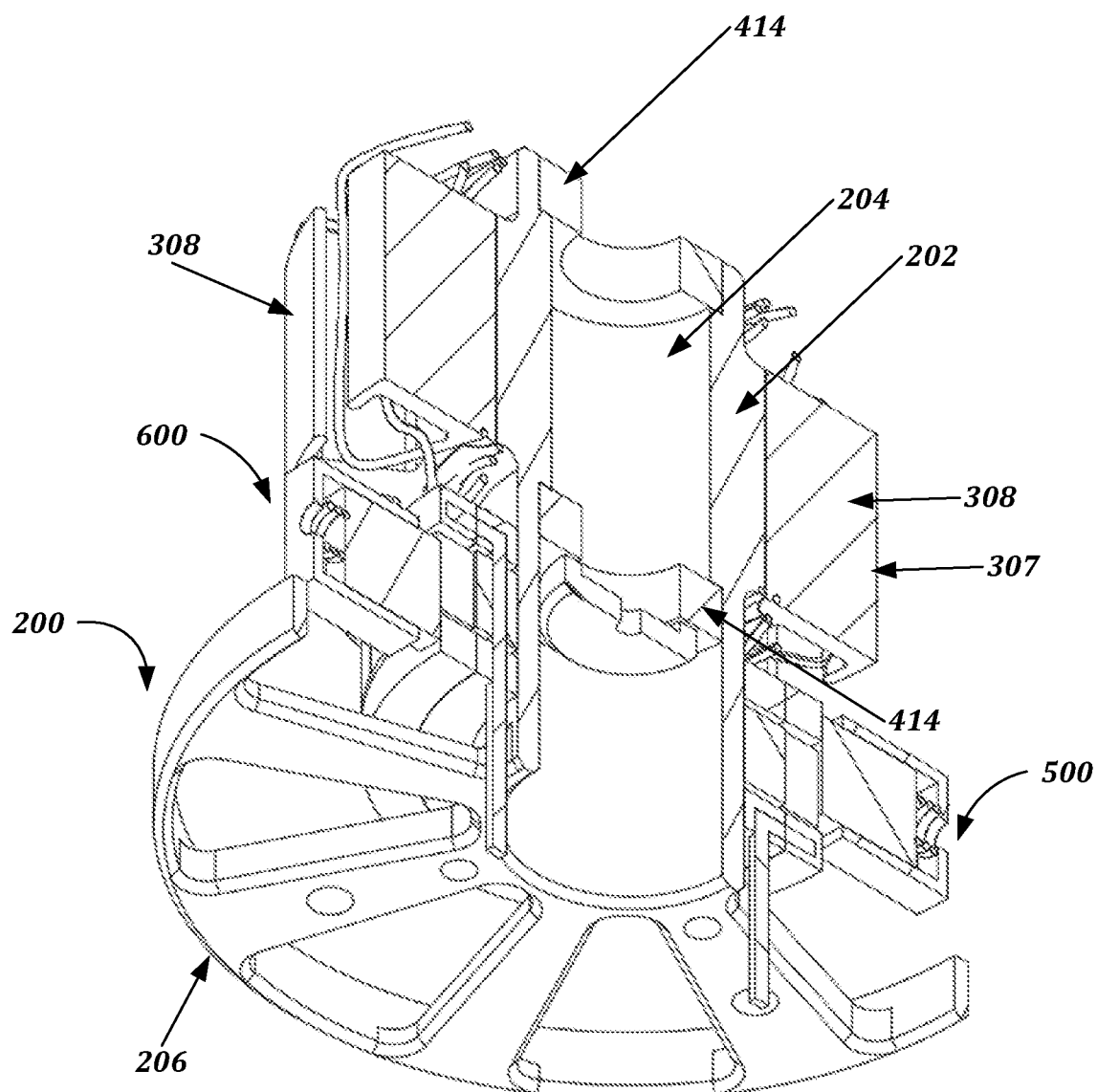
FIG. 15 illustrates another cross-sectional perspective view of a portion of the motor 100.
Figure 16:
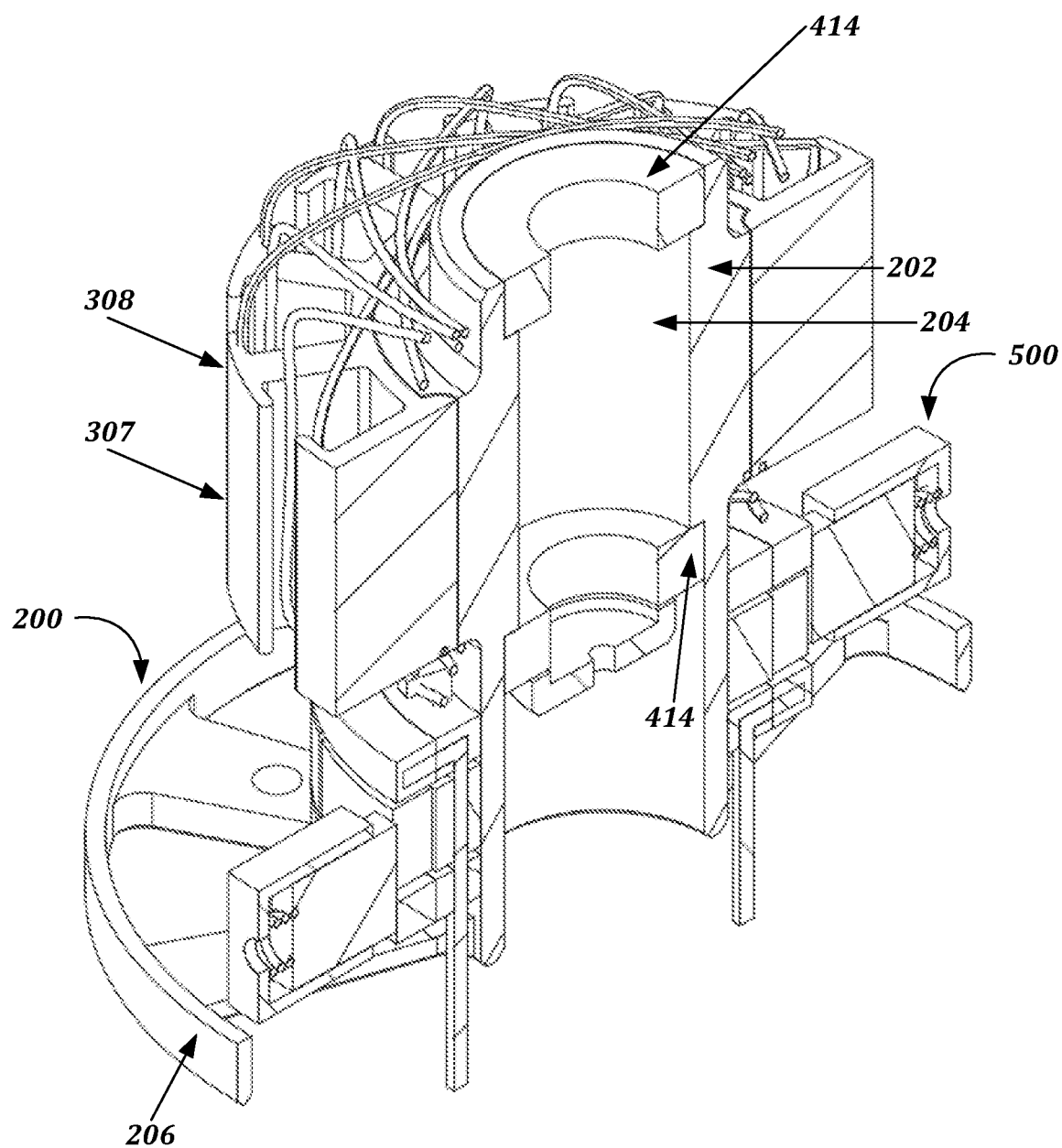
FIG. 16 illustrates a cross-sectional perspective view of a portion of the motor 100.
Figure 22:
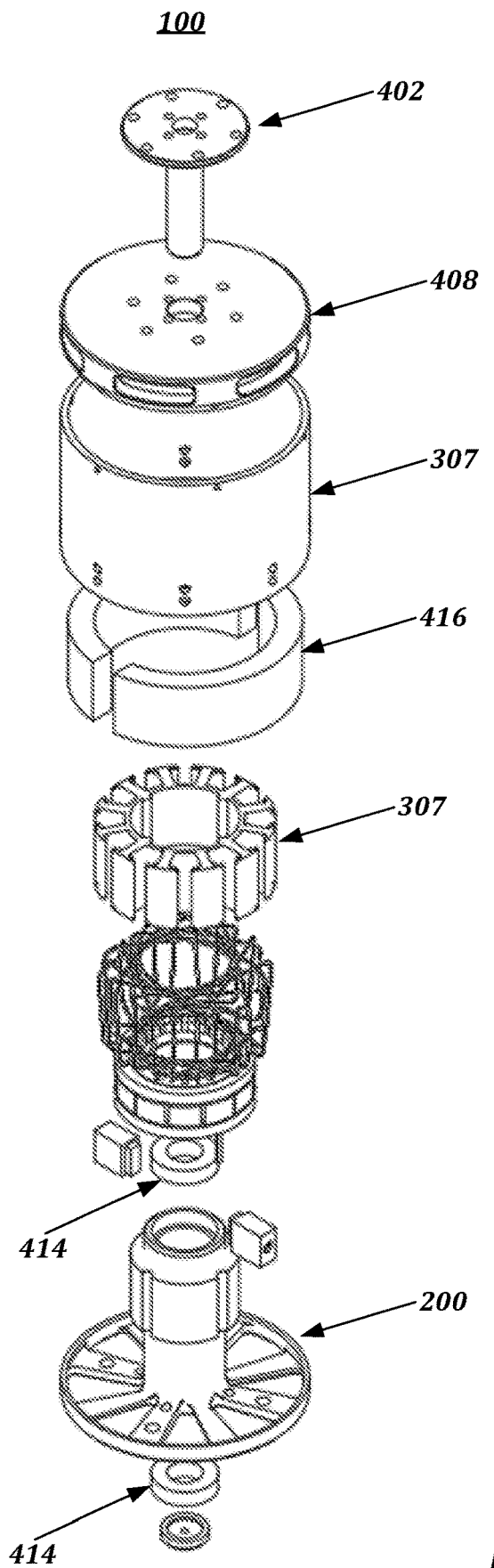
FIG. 22 illustrates an exploded view of the motor 100.

In further embodiments, the rotor 400 may comprise a plurality of rotor bearings 414, illustrated at least in FIGS. 15-16 and 22. The plurality of rotor bearings 414 may be used to facilitate rotational freedom of the rotor 400 relative to the commutator-armature system 300. The plurality of rotor bearings 414 may be further used to constrain relative motion to a desired motion. In some embodiments, the plurality of rotor bearings 414 may be disposed between the rotational shaft 402 and an inner wall of the stationary shaft cavity 204.

Figure 20:
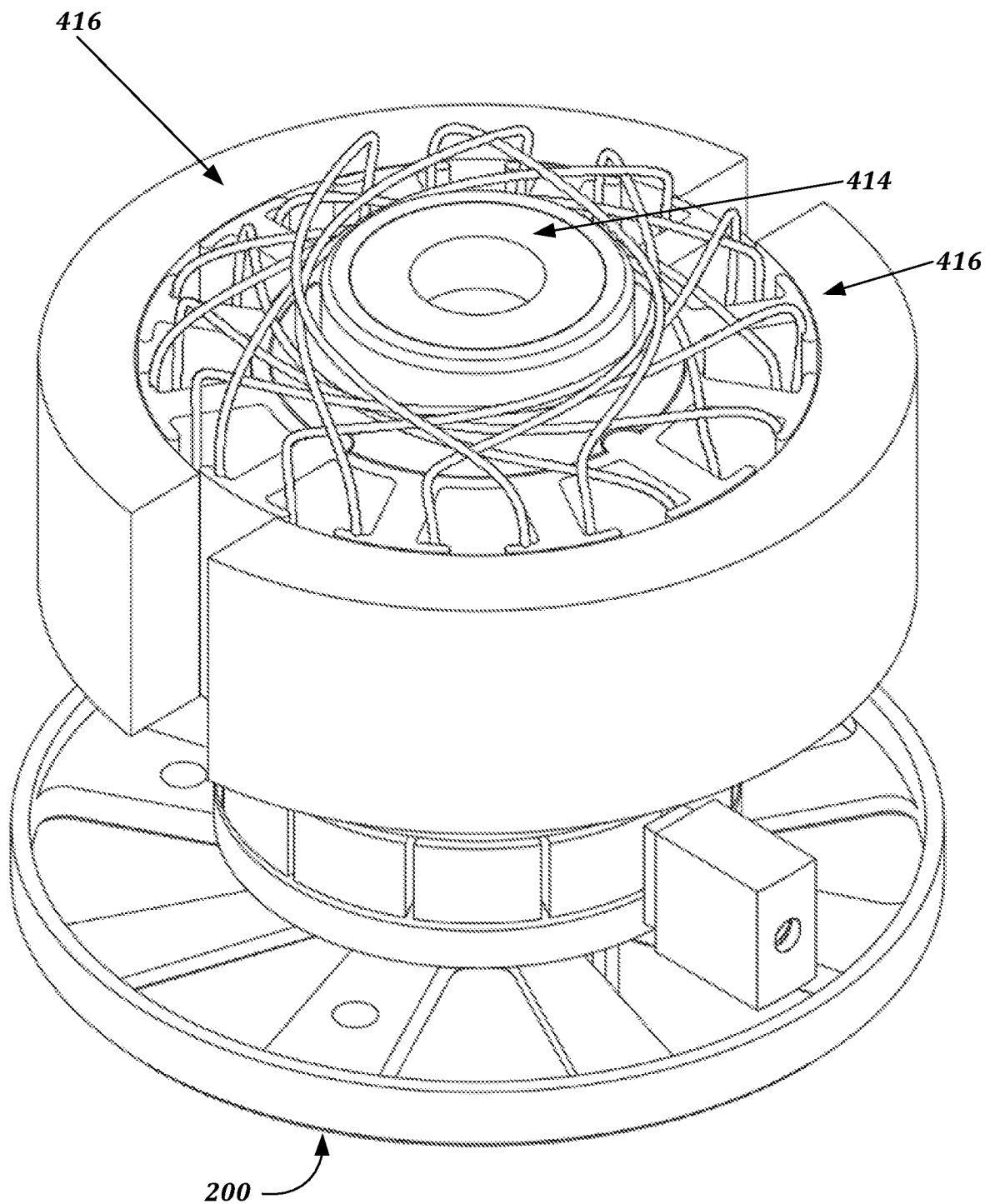
FIG. 20 illustrates another perspective view of a portion of the motor 100.
Figure 21:
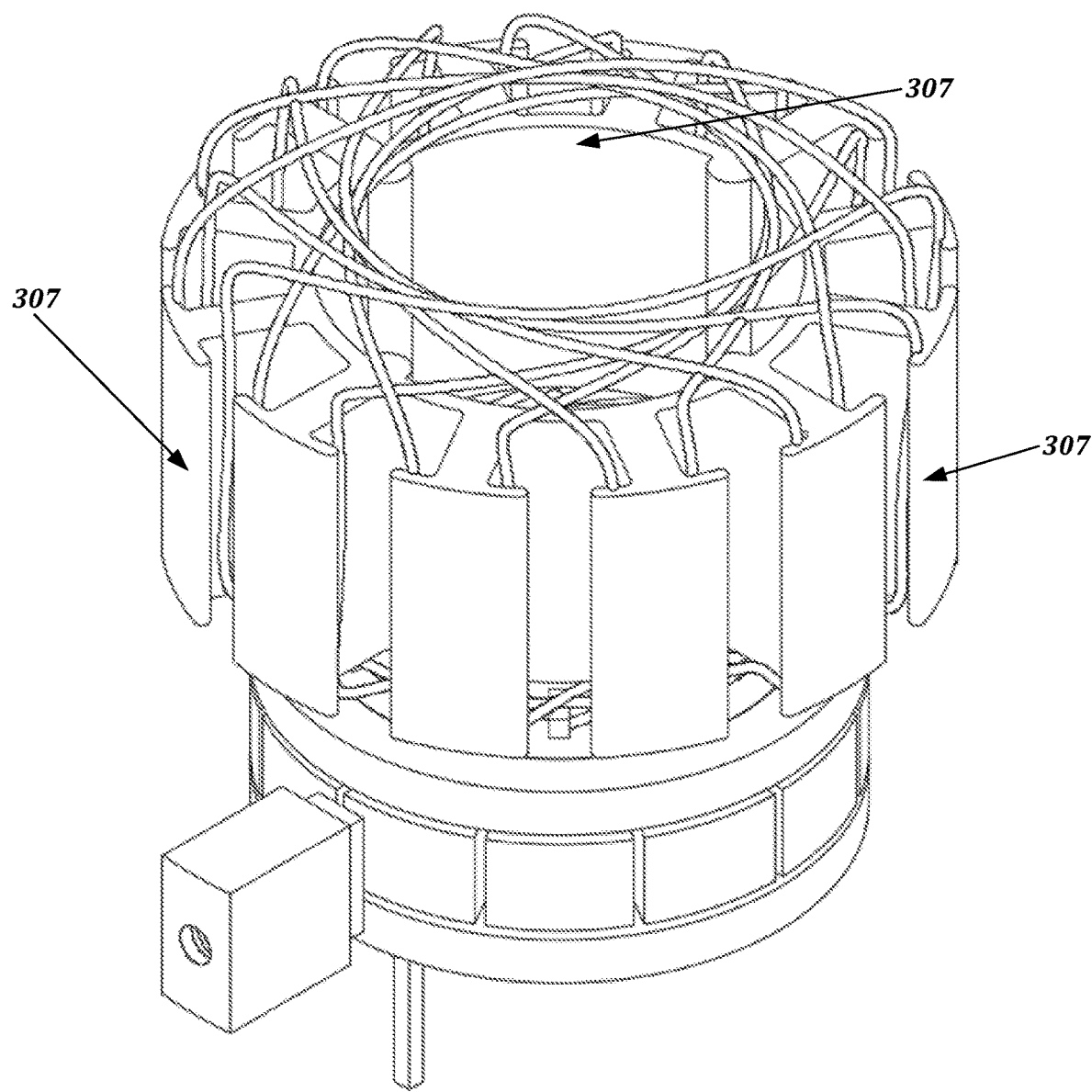
FIG. 21 illustrates another perspective view of at least a portion of the apparatus 100.

In further embodiments, the rotor 400 may comprise a plurality of magnets 416, illustrated at least in FIGS. 19-20. The plurality of magnets 416 may be used to responsive to an electromagnetic force being produced from the commutator-armature system 300, axially rotate. In some embodiments, the plurality of magnets 416 may be evenly distributed around an inner wall of the rotor housing 404. In further embodiments, the plurality of magnets 416 may be disposed on the same plane as the plurality of teeth 308. In further embodiments, the plurality of magnets 416 may be configured to axially rotate with the rotational shaft 402. In further embodiments, each of the plurality of magnets 416 may be arcuate in shape. In further embodiments, each of the plurality of magnets 416 may be substantially semicircular in shape. In further embodiments, each of the plurality of magnets 416 may comprise a first semicircular magnet and a second semicircular magnet. In further embodiments, each of the plurality of magnets 416 may be embodied as a permanent magnet and/or an electromagnet (having distributed-winding and/or being series-wound depending on how a field winding and armature winding are coupled).

D. First Brush System 500

At least FIGS. 1-16 illustrate the first brush system 500 consistent with an embodiment of the disclosure. The first brush system 500 may be used to facilitate (and/or channel) flow of electrical current from the top slip ring 320 to the respective commutator segment, of the plurality of commutator segments 302, in physical contact with the first brush system 500. The first brush system 500 may be configured to rotate in accordance with the rotational shaft 402 and/or the plurality of magnets 416. At least a portion of the first brush system 500 may be secured to other portions of the first brush system 500 and/or other portions (and/or components) of the apparatus 100 via nuts, bolts, screws, welding, adhesive, friction fit, and/or any other suitable securing means.

In some embodiments, the first brush system 500 may comprise a first brush housing 502, illustrated at least in FIGS. 5, 7, and 8-11. The first brush housing 502 may be used to secure, house, and/or receive various components of the first brush system 500. The first brush housing 502 may further be used to attach the first brush system 500 to the rotor housing outer ring 410 via any suitable securing means (oriented in linear alignment with at least a portion of the top slip ring 320). The first brush housing 502 may be made from an insulating material, such as, but not limited to, plastic, thermoplastic, polycarbonate, polyethylene, polypropylene, polymethyl methacrylate, and/or any other suitable type of plastic having insulating properties. The first brush housing 502 may be used to insulate a first brush 508 from other parts of the motor 100 (e.g., the rotor housing outer ring 410). In some embodiments, the first brush housing 502 may be rectangular in shape and/or any other suitable shape. In some embodiments, the first brush housing 502 may comprise a first aperture 504, illustrated at least in FIG. 14. In further embodiments, the first brush housing 502 may comprise a first back wall 506, illustrated at least in FIGS. 5 and 8.

Figure 8:
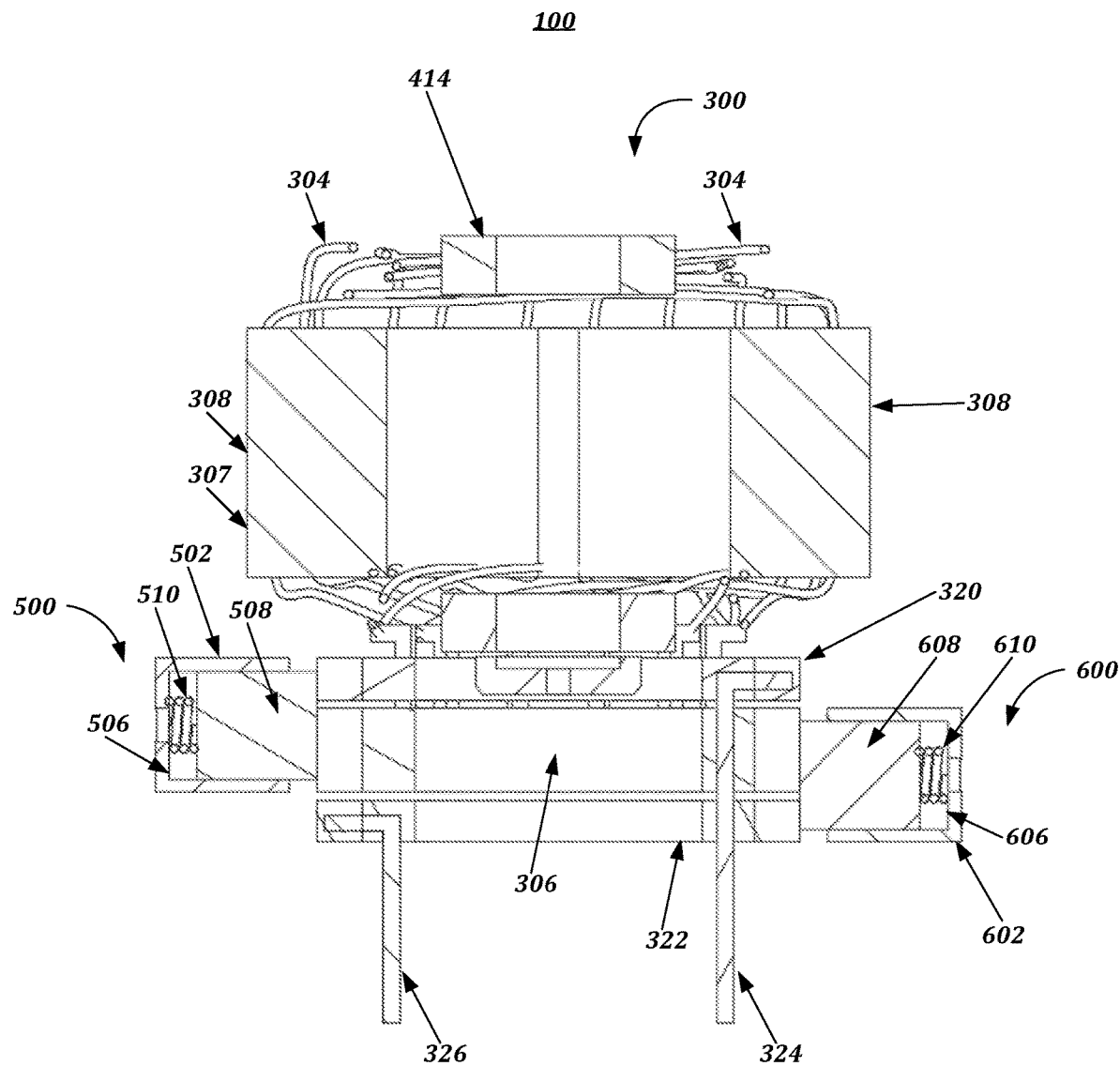
FIG. 8 illustrates another cross-sectional side view of a portion of the motor 100.
Figure 9:
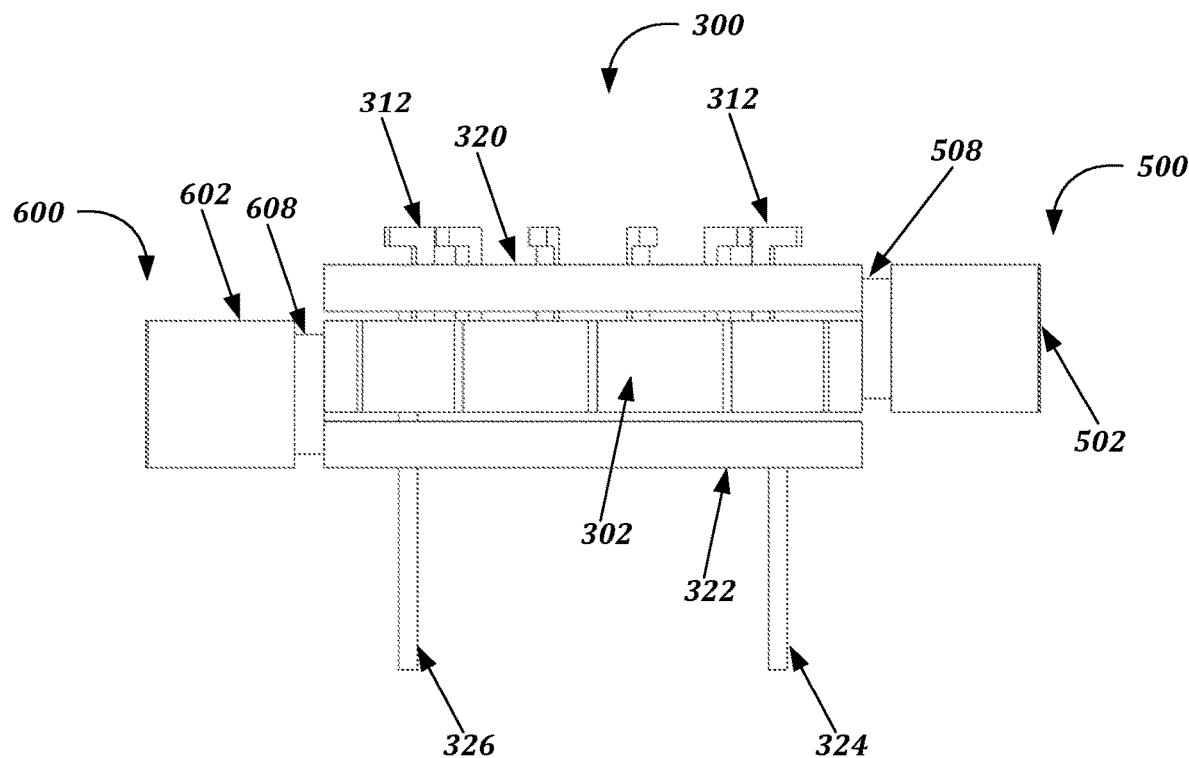
FIG. 9 illustrates another side view of a portion of the motor 100.
Figure 10:
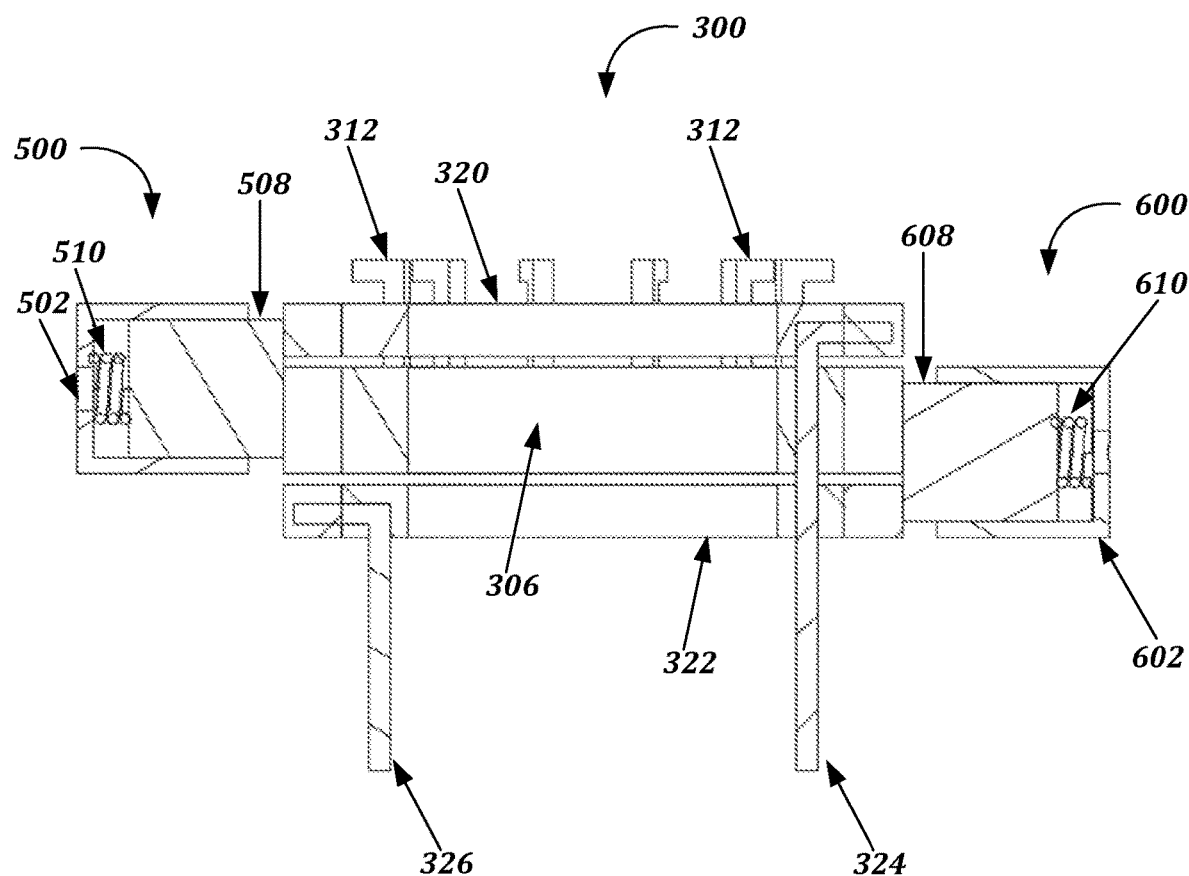
FIG. 10 illustrates another cross-sectional side view of a portion of the motor 100.
Figure 11:
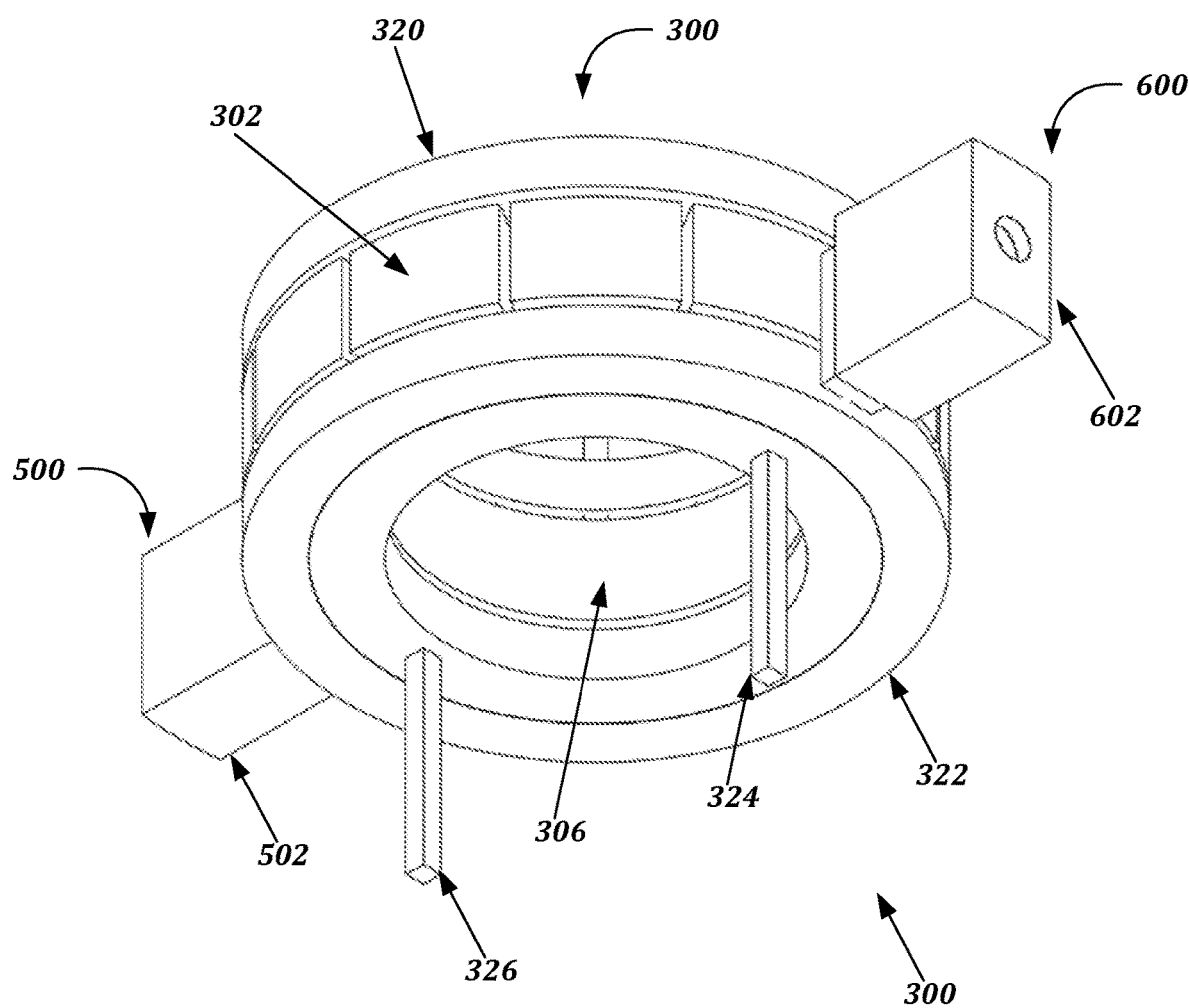
FIG. 11 illustrates another perspective view of a portion of the motor 100.
Figure 12:
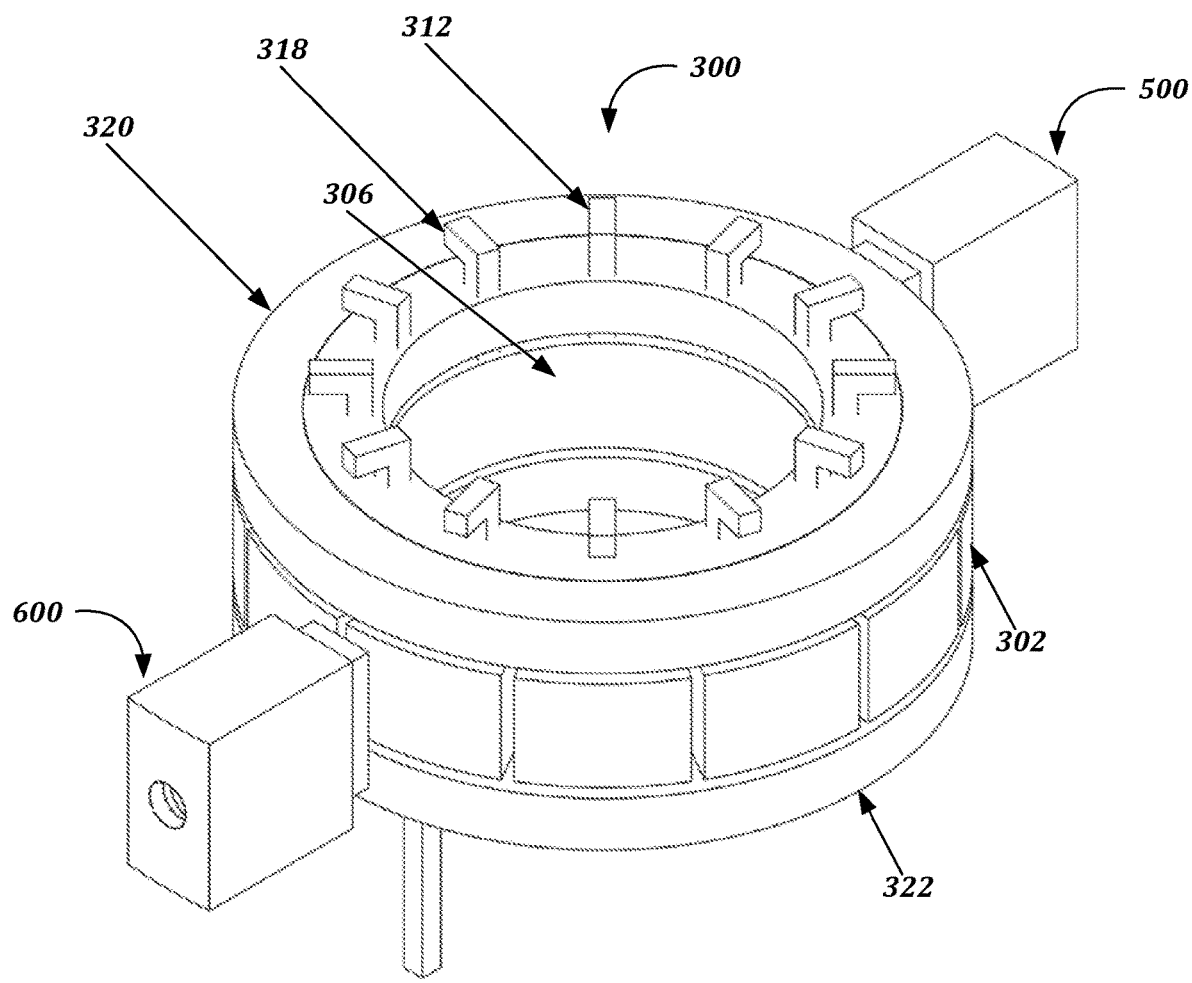
FIG. 12 illustrates another perspective view of a portion of the motor 100.
Figure 13:
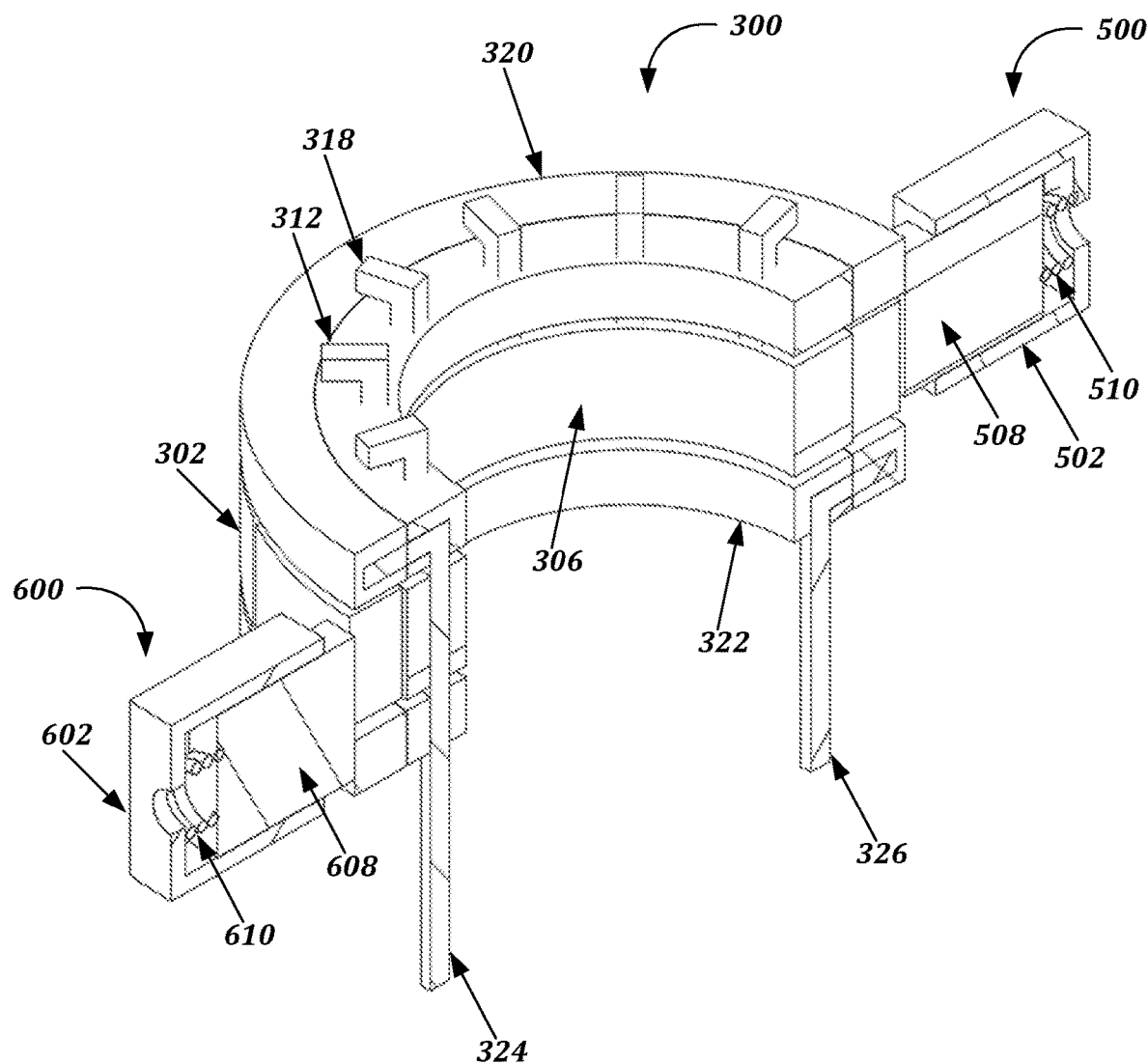
FIG. 13 illustrates another cross-sectional perspective view of a portion of the motor 100.
Figure 14:
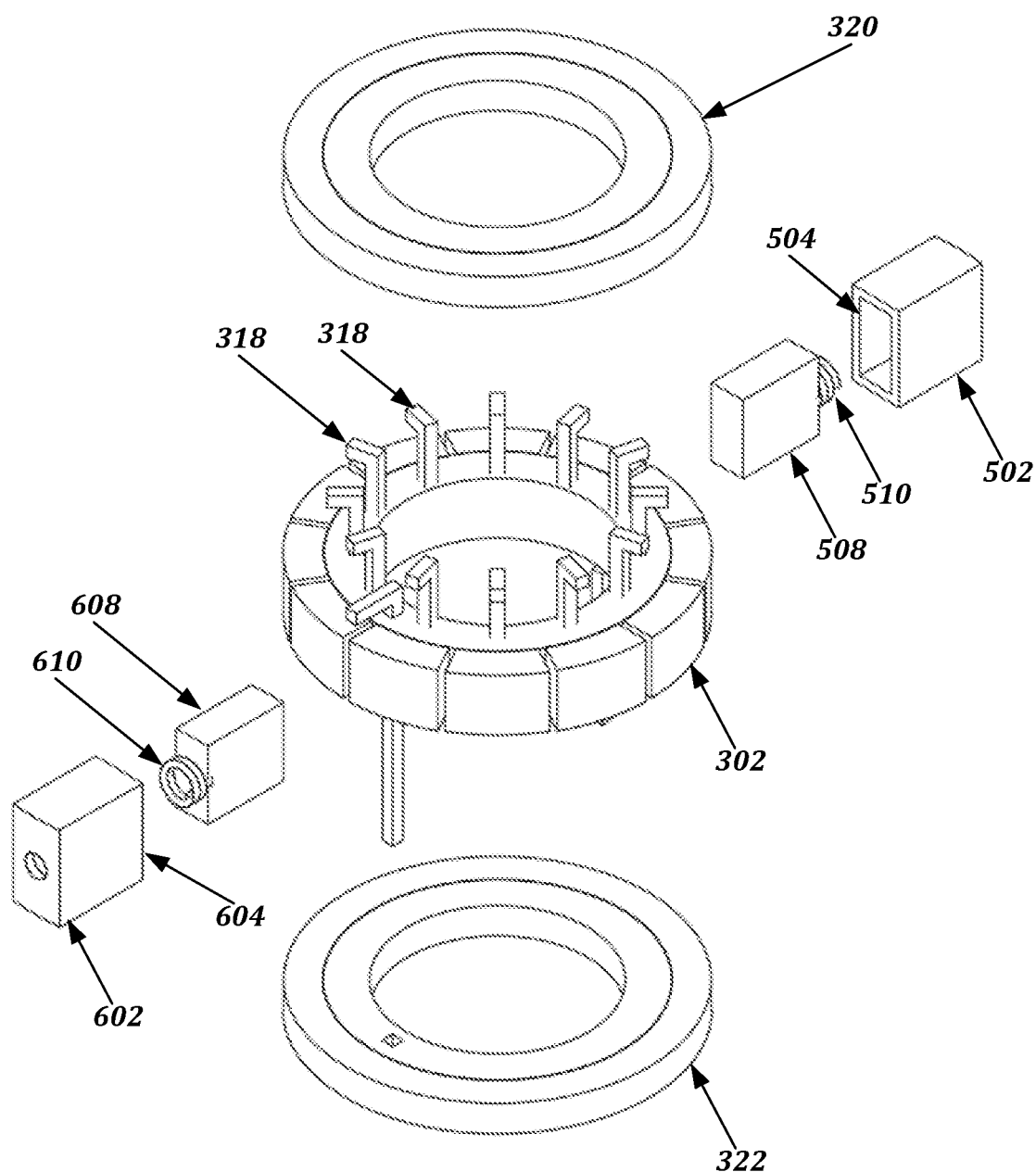
FIG. 14 illustrates another exploded view of a portion of the motor 100.

In further embodiments, the first brush system 500 may comprise a first brush 508, illustrated at least in FIGS. 5 and 8. The first brush 508 may be used to conduct and/or transfer electrical current from the top slip ring 320 to one or more of the plurality of commutator segments 302 in physical contact with the first brush 508 (as the first brush system 500 rotates around the commutator-armature system 300). The first brush 508 may be made from a soft conductive material. At least a portion of the first brush 508 may be housed in the first brush housing 502, in which a portion of the first brush 508 protrudes from the first aperture 504. The first brush 508 may be configured to contact the top slip ring 320.

In further embodiments, the first brush system 500 may comprise a first brush tensions means 510, illustrated at least in FIGS. 5, 8, 10, and 13-14. The first brush tension means 510 may be used to facilitate the first brush 508 maintaining contact with the one or more of the plurality of commutator segments 302. In some embodiments, the first tension means may be disposed between the first back wall 506 and the first brush 508.

D. Second Brush System 600

At least FIGS. 1-16 illustrate the second brush system 600 consistent with an embodiment of the disclosure. The second brush system 600 may be used to facilitate (and/or channel) flow of electrical current from the bottom slip ring 322 to the respective commutator segment, of the plurality of commutator segments 302, in physical contact with the second brush system 600. The second brush system 600 may be configured to rotate in accordance with the rotational shaft 402 and/or the plurality of magnets 416. At least a portion of the second brush system 600 may be secured to other portions of the second brush system 600 and/or other portions (and/or components) of the apparatus 100 via nuts, bolts, screws, welding, adhesive, friction fit, and/or any other suitable securing means.

In some embodiments, the second brush system 600 may comprise a second brush housing 602, illustrated at least in FIGS. 5, 7, and 8-11. The second brush housing 602 may be used to secure, house, and/or receive various components of the second brush system 600. The second brush housing 602 may further be used to attach the second brush system 600 to the rotor housing outer ring 410 via any suitable securing means (oriented in linear alignment with at least a portion of the bottom slip ring 322). The second brush housing 602 may be made from an insulating material, such as, but not limited to, plastic, thermoplastic, polycarbonate, polyethylene, polypropylene, polymethyl methacrylate, and/or any other suitable type of plastic having insulating properties. The second brush housing 602 may be used to insulate a second brush 608 from other parts of the motor 100 (e.g., the rotor housing outer ring 410). In some embodiments, the second brush housing 602 may be rectangular in shape and/or any other suitable shape. In some embodiments, the second brush housing 602 may comprise a second aperture 604, illustrated at least in FIG. 14. In further embodiments, the second brush housing 602 may comprise a second back wall 606, illustrated at least in FIGS. 5 and 8.

In further embodiments, the second brush system 600 may comprise a second brush 608, illustrated at least in FIGS. 5 and 8. The second brush 608 may be used to conduct and/or transfer electrical current from the bottom slip ring 322 to one or more of the plurality of commutator segments 302 in physical contact with the second brush 608 (as the second brush system 600 rotates around the commutator-armature system 300). The second brush 608 may be made from a soft conductive material. At least a portion of the second brush 608 may be housed in the second brush housing 602, in which a portion of the first brush 608 protrudes from the first aperture 604. The second brush 608 may be configured to contact the top slip ring 320.

In further embodiments, the second brush system 600 may comprise a second brush tensions means 610, illustrated at least in FIGS. 5, 8, 10, and 13-14. The second brush tension means 610 may be used to facilitate the second brush 608 maintaining contact with the one or more of the plurality of commutator segments 302. In some embodiments, the second tension means may be disposed between the second back wall 606 and the second brush 608.

III. Apparatus/System Use

Embodiments of the present disclosure provide a system operative by a set of methods comprising instructions configured to operate the aforementioned components in accordance with the methods. The following depicts an example of a method of a plurality of methods that may be performed by at least one of the aforementioned components. Various hardware components may be used at the various stages of operations disclosed with reference to each component.

For example, although methods may be described to be performed by a single component, it should be understood that, in some embodiments, different operations may be performed by different components in operative relation with one another. For example, an apparatus may be employed in the performance of some or all of the stages disclosed with regard to the methods. As such, the apparatus may comprise at least one architectural component disclosed herein.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

Figure 23:
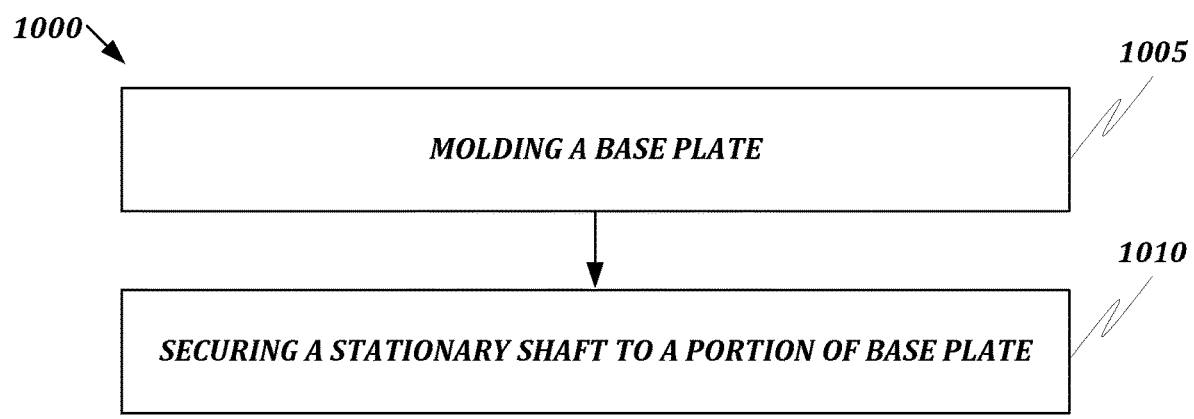
FIG. 23 illustrates a method 1000 for assembling a motor base of a brushed direct current motor.

Consistent with embodiments of the present disclosure, a method 1000 for assembling a motor base of a brushed direct current motor may be performed by at least one of the aforementioned components. The method 1000, illustrated at least in FIG. 23 may comprise the following stages:

1. 1005—molding (and/or casting) a planar portion 206,
   a. at least a portion of the planar portion 206 being planar, ring-shaped, and/or toroidal in shape,
   b. at least a portion of the planar portion 206 having one or more gaps and/or apertures; and
2. 1010—securing a stationary shaft 202 to a portion of planar portion 206,
   a. the stationary shaft 202 protruding from a middle portion of the planar portion 206,
   b. the stationary shaft 202 protruding orthogonally from the planar portion 206,
   c. the stationary shaft 202 comprising a stationary shaft cavity 204,
      i. the stationary shaft cavity 204 being substantially cylindrical in shape.

Figure 24:
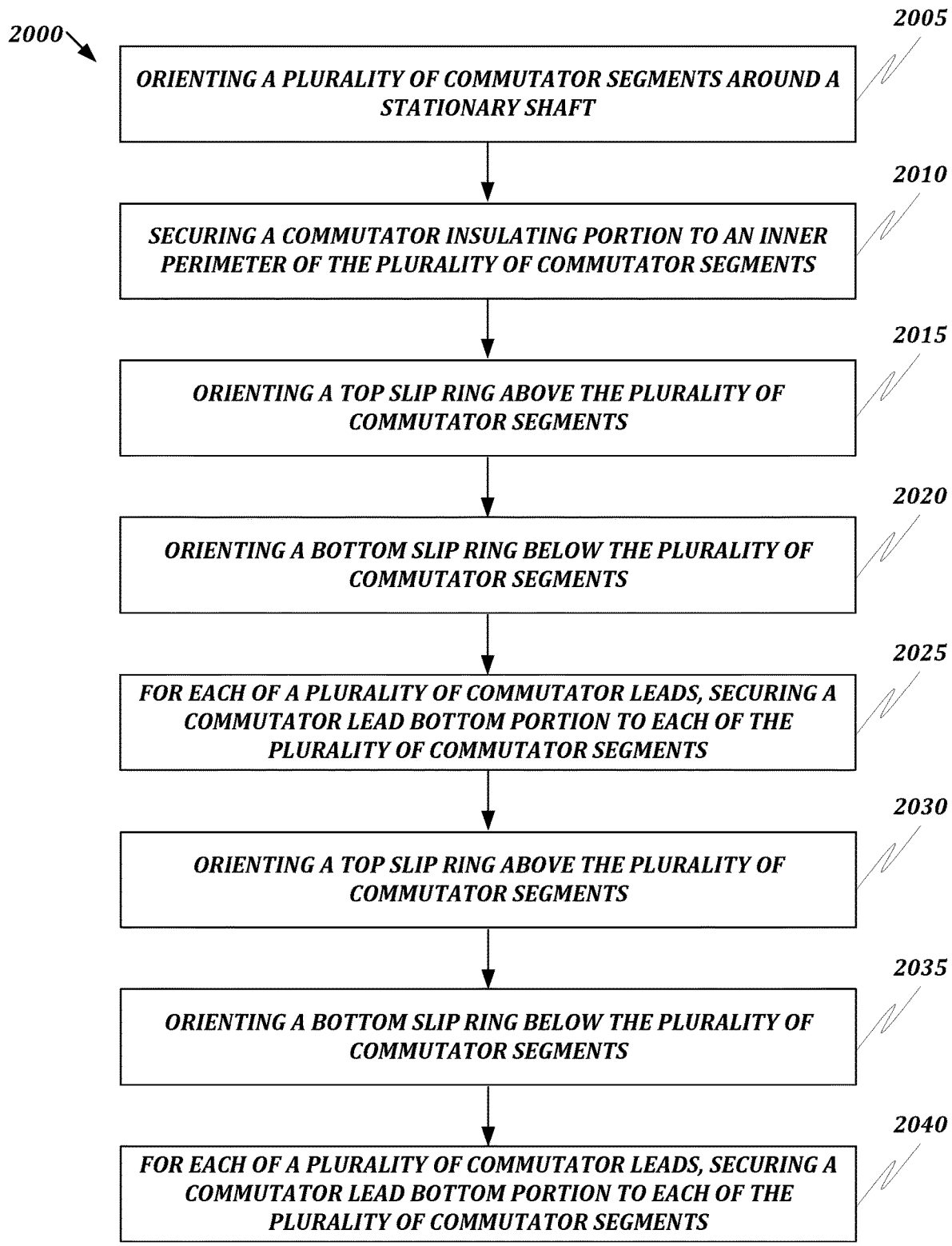
FIG. 24 illustrates a method 2000 for assembling a commutator-armature system for a brushed direct current motor.

Consistent with embodiments of the present disclosure, a method 2000 for assembling a commutator-armature system for a brushed direct current motor may be performed by at least one of the aforementioned components and/or be incorporated with any of the aforementioned methods. The method 2000, illustrated at least in FIG. 24 may comprise the following stages:

1. 2005—orienting a plurality of commutator segments 302 around a stationary shaft 202:
   a. the plurality of commutator segments 302 being arranged in a circular orientation;
2. 2010—securing a commutator insulating portion 306 to an inner perimeter of the plurality of commutator segments 302,
   a. The commutator insulating portion 306 being configured to insulate the plurality of commutator segments 302 from a plurality of commutator leads 312;
3. 2015—orienting a top slip ring 320 above the plurality of commutator segments 302,
   a. a first direct current wire 324 being connected to the top slip ring 320;
4. 2020—orienting a bottom slip ring 322 below the plurality of commutator segments 302,
   a. a second direct current wire 326 being connected to the bottom slip ring 322;
5. 2025—for each of a plurality of commutator leads 312, securing a commutator lead bottom portion 314 to each of the plurality of commutator segments 302;
6. 2030—for each of the plurality of commutator leads 312, securing a commutator lead middle portion through the commutator insulating portion 306 such that a commutator lead top portion 318 protrudes above the top slip ring 320;
7. 2035—orienting a plurality of commutator teeth 308 around the stationary shaft 202 forming a stator 307:
   a. the stator 307 being oriented above the plurality of commutator segments 302,
   b. a plurality of slots 310 being formed therebetween the plurality of commutator teeth 308,
      i. The plurality of slots 310 being configured to group each of a portion of a plurality of wires 304;
   c. the plurality of commutator teeth 308 being arranged in a circular orientation;
8. 2040—for each of a first set of the plurality of commutator segments 302, connecting to an opposing commutator segment of a second set of the plurality of commutator segments 302 via the portion of the plurality of wires 304, the connecting comprising:
   a. connecting a first distal end of each portion of the plurality of wires 304 to the commutator lead top portion 318 corresponding to each of the first set of the plurality of commutator segments 302,
   b. guiding each portion of the plurality of wires 304 through one of the plurality of slots 310 oriented above the each of the first set of the plurality of commutator segments 302,
   c. guiding (and/or wrapping) each portion of the plurality of wires 304 around the stationary shaft 202,
   d. guiding each portion of the plurality of wires 304 through another one of the plurality of slots 310 oriented above the opposing commutator segment of a second set of the plurality of commutator segments 302, e. connecting a second distal end of each portion of the plurality of wires 304 to the commutator lead top portion 318 corresponding to each of the second set of the plurality of commutator segments 302,
f. thereby forming a complete electrical circuit.

Figure 25:
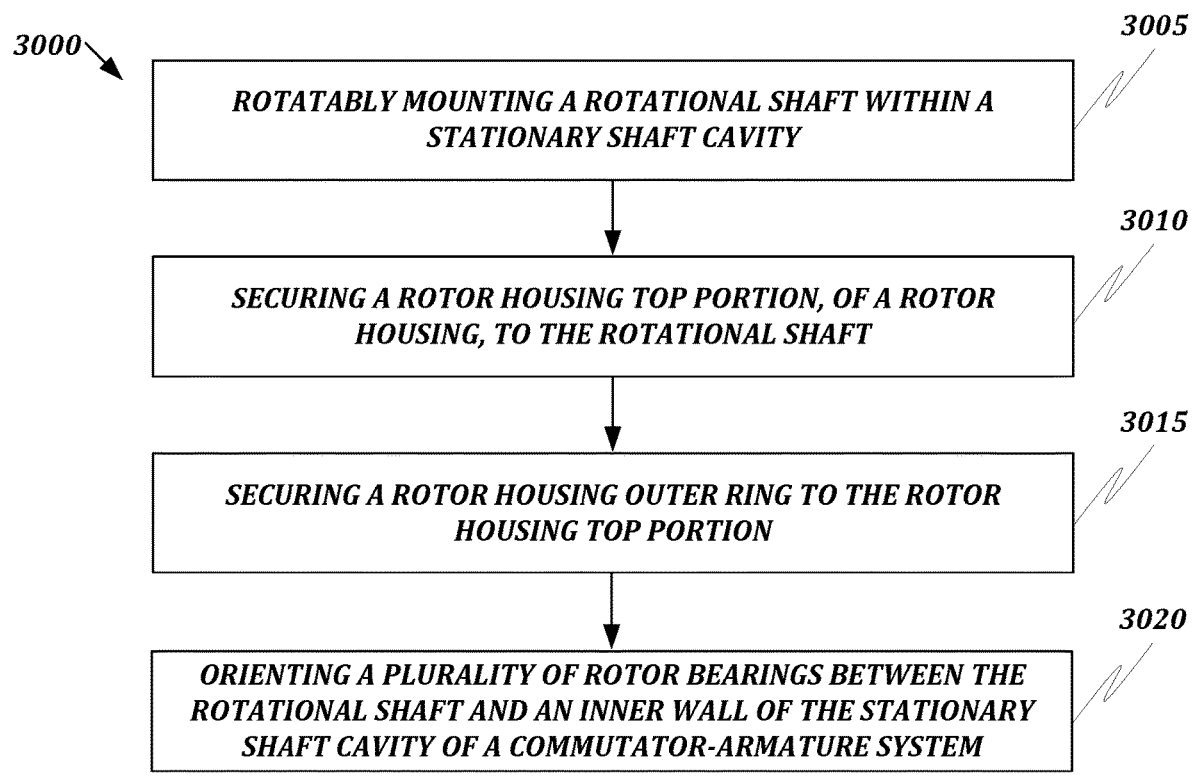
FIG. 25 illustrates a method 3000 for assembling a rotor for a brushed direct current motor.

Consistent with embodiments of the present disclosure, a method 3000 for assembling a rotor for a brushed direct current motor may be performed by at least one of the aforementioned components and/or be incorporated with any of the aforementioned methods. The method 3000, illustrated at least in FIG. 25, may comprise the following stages:

1. 3005—rotatably mounting a rotational shaft 402 within a stationary shaft cavity 204,
   a. the rotational shaft 402 being cylindrical in shape;
2. 3010—securing a rotor housing top portion 408, of a rotor housing 404, to the rotational shaft 402;
3. 3015—securing a rotor housing outer ring 410 to the rotor housing top portion 408; and
4. 3020—orienting a plurality of rotor bearings 414 between the rotational shaft 402 and an inner wall of the stationary shaft cavity 204 of a commutator-armature system 300.

Figure 26:
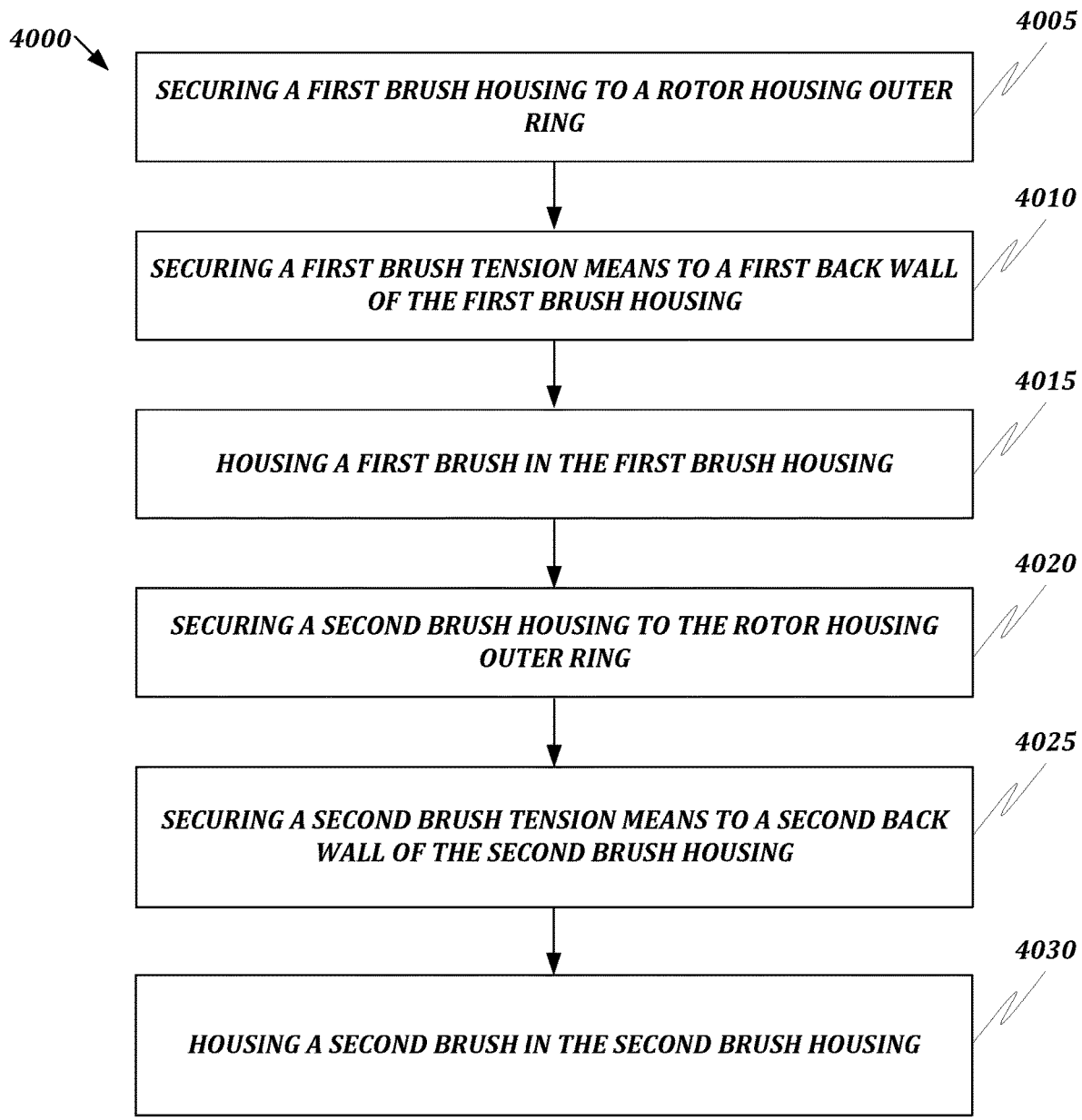
FIG. 26 illustrates a method 4000 for assembling a brush system for a brushed direct current motor.

Consistent with embodiments of the present disclosure, a method 4000 for assembling a brush system for a brushed direct current motor may be performed by at least one of the aforementioned components and/or be incorporated with any of the aforementioned methods. The method 4000, illustrated at least in FIG. 26, may comprise the following stages:

1. 4005—securing a first brush housing 502 to a rotor housing outer ring 410,
   a. The first brush housing 502 being oriented in linear alignment with at least a portion of a top slip ring 320,
2. 4010—securing a first brush tension means 510 to a first back wall 506 of the first brush housing 502,
3. 4015—housing a first brush 508 in the first brush housing 502,
   a. such that a portion of the first brush 508 protrudes from a first aperture 504, and
   b. the first brush tension means 510 is oriented between the first back wall 506 and the first brush 508,
      i. such that the first brush 508 maintains physical contact with the top slip ring 320 and one or more of a plurality of commutator segments 302;
4. 4020—securing a second brush housing 602 to the rotor housing outer ring 410,
   a. The second brush housing 602 being oriented in linear alignment with at least a portion of a bottom slip ring 322,
5. 4025—securing a second brush tension means 610 to a second back wall 606 of the second brush housing 602,
6. 4030—housing a second brush 608 in the second brush housing 602,
   a. such that a portion of the second brush 608 protrudes from a second aperture 604, and
   b. the second brush tension means 610 is oriented between the second back wall 606 and the second brush 608,
      i. such that the second brush 608 maintains physical contact with the bottom slip ring 320 and one or more of a plurality of commutator segments 302,
   c. the brush system being configured to rotate in accordance with a rotational shaft 402 and a plurality of magnets 416.

Figure 27A:
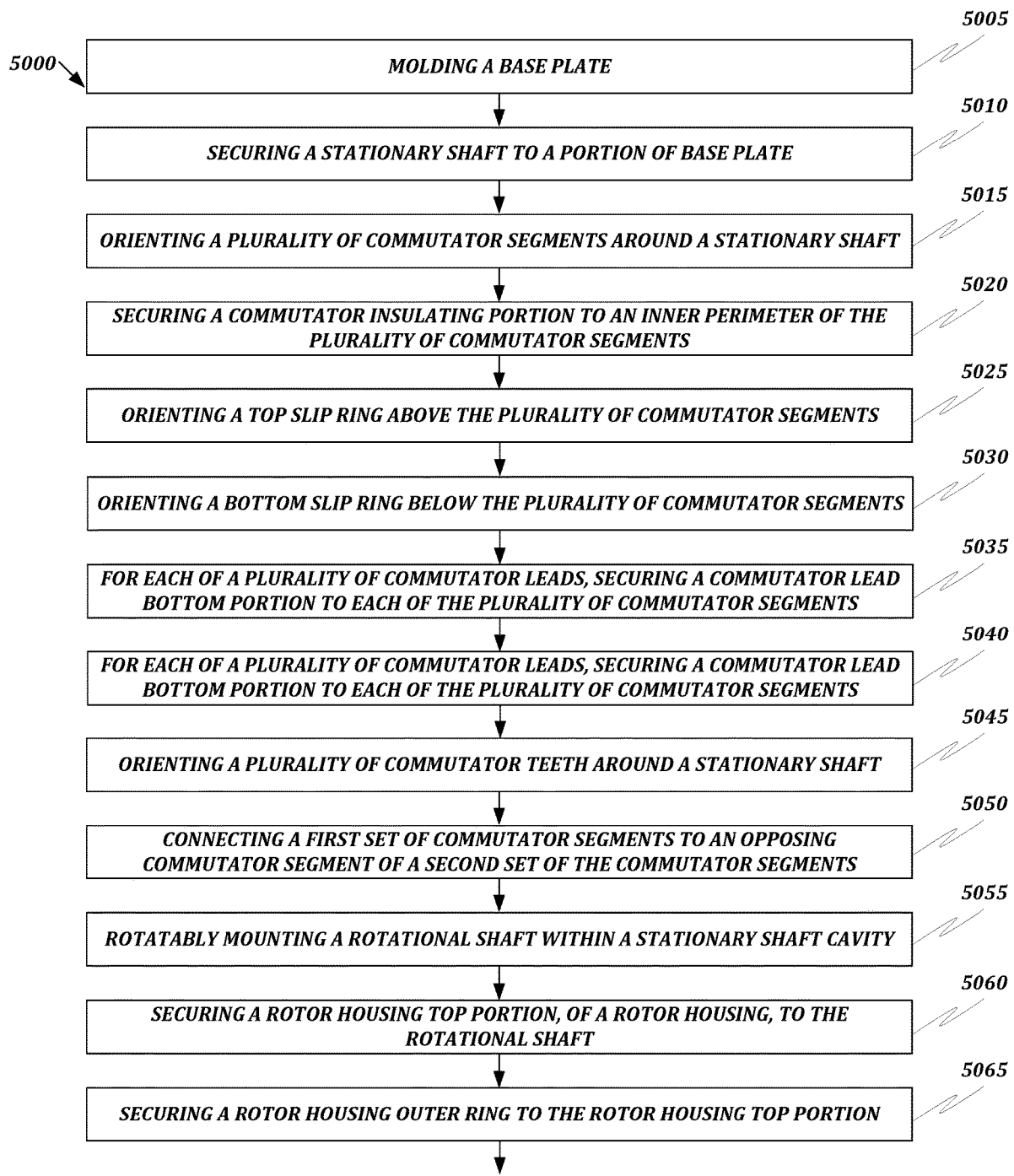
FIGS. 27A-27B illustrates a method 5000 for assembling a brushed direct current motor.
Figure 27B:
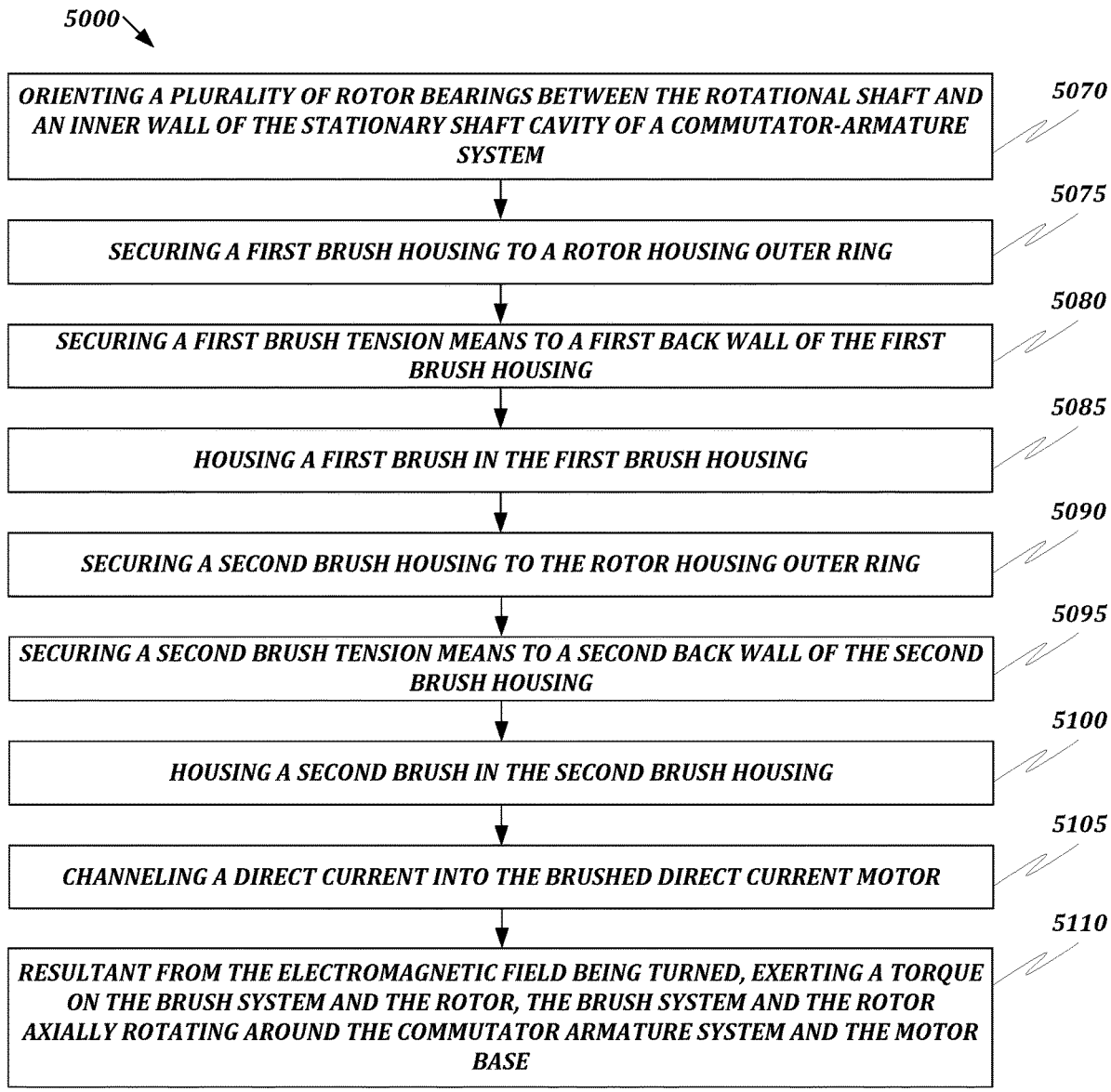

Consistent with embodiments of the present disclosure, a method 4000 for assembling a brushed direct current motor may be performed by at least one of the aforementioned components and/or be incorporated with any of the aforementioned methods. The method 5000, illustrated at least in FIGS. 27A-27B, may comprise the following stages:

1. 5005—molding (and/or casting) a planar portion 206,
2. 5010—securing a stationary shaft 202 to a portion of planar portion 206,
3. 5015—orienting a plurality of commutator segments 302 around a stationary shaft 202:
4. 5020—securing a commutator insulating portion 306 to an inner perimeter of the plurality of commutator segments 302,
5. 5025—orienting a top slip ring 320 above the plurality of commutator segments 302,
6. 5030—orienting a bottom slip ring 322 below the plurality of commutator segments 302,
7. 5035—for each of a plurality of commutator leads 312, securing a commutator lead bottom portion 314 to each of the plurality of commutator segments 302;
8. 5040—for each of the plurality of commutator leads 312, securing a commutator lead middle portion through the commutator insulating portion 306 such that a commutator lead top portion 318 protrudes above the top slip ring 320;
9. 5045—orienting a plurality of commutator teeth 308 around the stationary shaft 202:
10. 5050—for each of a first set of the plurality of commutator segments 302, connecting to an opposing commutator segment of a second set of the plurality of commutator segments 302 via the portion of the plurality of wires 304, the connecting comprising:
9. 5055—rotatably mounting a rotational shaft 402 within a stationary shaft cavity 204,
10. 5060—securing a rotor housing top portion 408, of a rotor housing 404, to the rotational shaft 402;
11. 5065—securing a rotor housing outer ring 410 to the rotor housing top portion 408; and
12. 5070—orienting a plurality of rotor bearings 414 between the rotational shaft 402 and an inner wall of the stationary shaft cavity 204 of a commutator-armature system 300.
13. 5075—securing a first brush housing 502 to a rotor housing outer ring 410,
14. 5080—securing a first brush tension means 510 to a first back wall 506 of the first brush housing 502,
15. 5085—housing a first brush 508 in the first brush housing 502,
16. 5090—securing a second brush housing 602 to the rotor housing outer ring 410,
17. 5095—securing a second brush tension means 610 to a second back wall 606 of the second brush housing 602,
18. 5100—housing a second brush 608 in the second brush housing 602,
19. 5105—channeling a direct current into the brushed direct current motor,
    a. Thereby forming electromagnetic field in a portion of the plurality of wires 304 connected to a first commutator segment of the plurality of commutator segments 302 in contact with the first brush 508 and a second commutator segment of the plurality of commutator segments 302 in contact with the second brush 608;
20. 5110—resultant from the electromagnetic field being formed, exerting a torque on the brush system and the rotor, the brush system and the rotor axially rotating around the commutator armature system and the motor base.

It is noted that a square and/or sine commutation may be used for the apparatus 100.

Although the stages are disclosed in a particular order, it should be understood that the order is disclosed for illustrative purposes only. Stages in any of the aforementioned methods may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

IV. Aspects

The following disclose various Aspects of the present disclosure. The various Aspects are not to be construed as patent claims unless the language of the Aspect appears as a patent claim. The Aspects describe various non-limiting embodiments of the present disclosure.

Aspect 1. A brush may be embodied as an electrode.

Aspect 2. The apparatus may be slotted, slot-less, and/or coreless

Aspect 3. The apparatus may use polyphase and/or 3 phase, a type of AC motor that is a specific example of a polyphase motor.

Aspect 4. Magnetic flux density at a point becomes large as a magnet is magnetized in a surface area perpendicular to the magnetization direction becoming small. When increasing magnetic resistance is present in a magnetic circuit, magnetic flux density is lowered. When length of a gap widens, magnetic flux density is decreased.

Aspect 5. The operating point of a permanent magnet is determined by a magnetic state where an auxiliary magnetic material has been removed, and shape of a magnet.

Aspect 6. The speed and torque of the apparatus 100 can be controlled by voltage of the direct current.

Aspect 7. For lap winding, the top and bottom coil ends are connected to an adjacent commutator segment.

Aspect 8. For wave winding, the wires are bent in opposite direction and connected to the commutator segments that are approximately two pole pitches apart.

Aspect 9. For two-layer winding, two coil sides of two different coils are accommodated in one slot. One coil side may be housed at a top portion of the slot and the other coil side may be at the bottom of the slot.

Aspect 10. An induction motor uses similar principles as a DC motor including the use of slip rings to transfer electrical current to the brushes.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A brushed direct-current (DC) slip ring motor comprising:
    a motor base comprising:
        a base plate, and
        a stationary shaft extending orthogonally from a central portion of the base plate, the stationary shaft comprising a stationary shaft cavity;
    a commutator-armature system secured to at least a portion of the stationary shaft, the commutator-armature system comprising:
        a plurality of commutator segments arranged in a circular orientation, each of a first set of the plurality of commutator segments being connected to an opposing commutator segment of a second set of the plurality of commutator segments via a portion of a plurality of wires,
        an insulating portion spanning an inner perimeter of the plurality of commutator segments,
        a plurality of teeth disposed above the plurality of commutator segments and arranged in a circular orientation forming a plurality of slots, the plurality of slots being configured to separate each of the portions of the plurality of wires, and
        a plurality of commutator leads, each of the plurality of commutator leads connected to one of the plurality of commutator segments on a first end and secured to one end of the portion of the plurality of wires on a second end;
    a top slip ring disposed above the plurality of commutator segments, the top slip ring being configured to receive channel electricity from a first direct current wire secured to the top slip ring;
    a bottom slip ring disposed below the plurality of commutator segments, the bottom slip ring being configured to receive channel electricity to a second direct current wire secured to the bottom slip ring,
    a rotor configured to axially rotate responsive to an electromagnetic field produced from the commutator-armature system, the rotor comprising:
        a rotational shaft, at least a portion of the rotational shaft affixed within the stationary shaft cavity,
        a rotor housing secured to a top portion of the rotational shaft and configured to house at least a portion of the commutator armature system,
    a plurality of magnets evenly distributed around an inner wall of the rotor housing on the same plane as the plurality of teeth and configured to axially rotate with the rotational shaft;
    a first brush system secured to an inner wall of the rotor housing and in contact with one or more of the plurality of commutator segments, the first brush system being configured to axially rotate with the rotor,
    a second brush system secured to an opposing side of the inner wall of the rotor housing as the first brush housing and in contact with one or more of the plurality of commutator segments, the second brush system being configured to axially rotate with the rotor.

2. The motor of claim 1, wherein the plurality of magnets comprise a first semicircular magnet and a second semicircular magnet.

3. The motor of claim 2, wherein the plurality of slots are made from a plurality of permeable layers.

4. The motor of claim 1, wherein the insulating portion is ring-shaped with a rectangular cross-section.

5. The motor of claim 1, wherein the top slip ring comprises a top slip ring insulating portion spanning an inner perimeter of the top slip ring.

6. The motor of claim 5, wherein the bottom slip ring comprises a bottom slip ring insulating portion spanning an inner perimeter of the top slip ring.

7. The motor of claim 1, wherein the base plate comprises a plurality of motor base apertures.

8. The motor of claim 1, wherein the plurality of rotor bearings are configured to permit rotational motion of the rotor relative to the commutator-armature system.

9. The motor of claim 1, wherein the commutator-armature system is configured to remain stationary while producing an electromagnetic force.

10. The motor of claim 9, wherein the motor base is configured to remain stationary responsive to direct current electricity flowing through the first brush system, the second brush system, and the commutator armature system.

11. A brushed direct-current (DC) slip ring motor comprising:
a motor base comprising:
a base plate, and
a stationary shaft extending orthogonally from a central portion of the base plate, the stationary shaft comprising a stationary shaft cavity;
a commutator-armature system secured to at least a portion of the stationary shaft, the commutator-armature system comprising:
a first set of a plurality of commutator segments, each of the first set of the plurality of commutator segments being connected to an opposing commutator segment of a second set of the plurality of commutator segments via a portion of a plurality of wires,
an insulating portion spanning an inner perimeter of the plurality of commutator segments,
a plurality of teeth disposed above the plurality of commutator segments and arranged to form a plurality of slots therebetween, the plurality of slots being configured to group each of the portions of the plurality of wires, and
a plurality of commutator leads, each of the plurality of commutator leads comprising:
a commutator lead bottom portion connected to one of the plurality of arcuate segments,
a commutator lead middle portion extending through a portion of the insulating portion, and
a commutator lead top portion secured to one end of the portion of the plurality of wires;
a top slip ring disposed above the plurality of commutator segments and below the plurality of teeth;
a bottom slip ring disposed below the plurality of commutator segments,
a first direct current wire secured to the top slip ring;
a second direct current wire secured to the bottom slip ring;
a rotor configured to axially rotate responsive to an electromagnetic field being produced from the commutator-armature system, the rotor comprising:
a rotational shaft, at least a portion of the rotational shaft affixed within the stationary shaft cavity,
a rotor housing comprising:
a rotor housing top portion secured to a top portion of the rotational shaft, and
a rotor housing outer ring secured to the rotor housing top portion,
a plurality of rotor bearings disposed between the rotational shaft and an inner wall of the stationary shaft cavity;
a plurality of magnets evenly distributed around an inner wall of the rotor housing on the same plane as the plurality of teeth and configured to axially rotate with the rotational shaft;
a first brush system configured to axially rotate with the rotor, the first brush system comprising:
a first brush housing secured to inner wall of the rotor housing below the plurality of magnets, the first brush housing comprising:
a first aperture, and
a first back wall,
a first brush housed in the first brush housing in which a portion of the first brush protrudes from the first aperture, the first brush being configured to contact the top slip ring, and
a first tension means oriented between the first back wall and the first brush, the first tension means being configured to maintain contact between the first brush and the top slip ring; and
a second brush system configured to axially rotate with the rotor, the second brush system comprising:
a second brush housing secured to inner wall of the rotor housing opposite the first brush housing, the first brush housing comprising:
a second aperture, and
a second back wall,
a second brush housed in the second brush housing in which a portion of the second brush protrudes from the second aperture, the second brush being configured to contact the bottom slip ring, and
a second tension means oriented between the back wall and the second brush, the second tension means being configured to maintain contact between the second brush and the bottom slip ring.

12. The motor of claim 11, wherein the plurality of magnets comprise a plurality of electromagnets.

13. The motor of claim 12, wherein the plurality of electromagnets are configured to receive direct current electricity from the top slip ring.

14. The motor of claim 11, wherein the commutator-armature system is configured to remain stationary while producing an electromagnetic field resultant from direct electrical current flowing through the motor.

15. The motor of claim 11, wherein three phase electricity is generated responsive to rotating mechanical power being applied to the rotational shaft.

16. A brushed direct-current (DC) slip ring motor comprising:
a commutator-armature system secured to at least a portion of a stationary shaft of a motor base, the commutator-armature system comprising:
a first set of a plurality of commutator segments, each of the first set of the plurality of commutator segments being connected to an opposing commutator segment of a second set of the plurality of commutator segments via a portion of a plurality of wires,
an insulating portion spanning an inner perimeter of the plurality of commutator segments,
a plurality of teeth disposed above the plurality of commutator segments and arranged in a circular orientation forming a plurality of slots, the plurality of slots being configured to separate each of the portions of the plurality of wires, and
a plurality of commutator leads, each of the plurality of commutator leads connected to one of the plurality of commutator segments on a first end and secured to one end of the portion of the plurality of wires on a second end;

a top slip ring secured to the stationary shaft and disposed above the plurality of commutator segments, the top slip ring being configured to channel electricity from a first direct current wire secured to the top slip ring;

a bottom slip ring secured to the stationary shaft and disposed below the plurality of commutator segments, the bottom slip ring being configured to channel electricity to a second direct current wire secured to the bottom slip ring, a rotor configured to axially rotate responsive to an electromagnetic field produced from the commutator-armature system, the rotor comprising:

a rotational shaft affixed within a cavity of the stationary shaft, a rotor housing secured to a top portion of the rotational shaft and configured to house at least a portion of the commutator armature system, a plurality of magnets evenly distributed around an inner wall of the rotor housing on the same plane as the plurality of teeth and configured to axially rotate with the rotational shaft;

a first brush system secured to an inner wall of the rotor housing and in contact with one or more of the plurality of commutator segments, the first brush system being configured to axially rotate with the rotor; and a second brush system secured to an opposing side of the inner wall of the rotor housing as the first brush housing and in contact with one or more of the plurality of commutator segments, the second brush system being configured to axially rotate with the rotor.

17. The motor of claim 16, wherein the motor base comprises a base plate the base plate comprising a plurality of motor base apertures.

18. The motor of claim 16, wherein the plurality of magnets comprise a first semicircular magnet and a second semicircular magnet.

19. The motor of claim 16, wherein the commutator-armature system is configured to remain stationary while producing an electromagnetic force resultant from direct electrical current flowing through the motor.

20. The motor of claim 16, further comprising a plurality of rotor bearings configured to permit rotational motion of the rotor relative to the commutator-armature system.

* * * * *